US011468102B2

(12) United States Patent
Eltabakh et al.

(10) Patent No.: US 11,468,102 B2
(45) Date of Patent: Oct. 11, 2022

(54) OPTIMIZING LIMIT QUERIES OVER ANALYTICAL FUNCTIONS

(71) Applicant: Teradata US, Inc., San Diego, CA (US)

(72) Inventors: Mohamed Ahmed Yassin Eltabakh, Worcester, MA (US); Mahbub Hasan, Bellevue, WA (US); Awny Kayed Al-Omari, Cedar Park, TX (US); Mohammed Al-Kateb, Rancho Palos Verdes, CA (US)

(73) Assignee: Teradata US, Inc., San Diego, CA (US)

( * ) Notice: Subject to any disclaimer, the term of this patent is extended or adjusted under 35 U.S.C. 154(b) by 87 days.

(21) Appl. No.: 17/034,348

(22) Filed: Sep. 28, 2020

(65) Prior Publication Data

US 2021/0382920 A1 Dec. 9, 2021

Related U.S. Application Data

(60) Provisional application No. 63/035,460, filed on Jun. 5, 2020.

(51) Int. Cl.
*G06F 16/2453* (2019.01)
*G06F 16/28* (2019.01)
*G06F 16/2455* (2019.01)
*G06F 16/22* (2019.01)

(52) U.S. Cl.
CPC ........ *G06F 16/288* (2019.01); *G06F 16/2282* (2019.01); *G06F 16/24545* (2019.01); *G06F 16/24554* (2019.01)

(58) Field of Classification Search
CPC .......... G06F 16/2453; G06F 16/24542; G06F 16/24545; G06F 16/24549
See application file for complete search history.

(56) References Cited

U.S. PATENT DOCUMENTS

| | | | |
|---|---|---|---|
| 2002/0184253 A1* | 12/2002 | Agarwal | G06F 16/24532 |
| 2006/0026133 A1* | 2/2006 | Ahmed | G06F 16/24545 |
| 2016/0171236 A1* | 6/2016 | Konik | G06F 21/6227 |
| | | | 707/784 |
| 2019/0220464 A1* | 7/2019 | Butani | G06F 16/24542 |
| 2020/0183921 A1 | 6/2020 | Subramanian et al. | |

OTHER PUBLICATIONS

PostgreSQL 8.1.23 Documentation, Chapter? Queries, 7.6 Limit and Offset, www.postgresql.org/docs/81/queries-limit.html, 1996-2020.

(Continued)

*Primary Examiner* — Grace Park
(74) *Attorney, Agent, or Firm* — Gates & Cooper LLP

(57) ABSTRACT

A relational database management system (RDBMS) optimizes limit queries over analytical functions, wherein the limit queries include an output clause comprising a LIMIT, TOP and SAMPLE clause with an expression specifying a limit that is a number K or a percentage α %. The optimizations of the limit queries include: (1) static compile-time optimizations, and (2) dynamic run-time optimizations, based on semantic properties of "granularity" and "input-to-output cardinality" for the analytical functions.

18 Claims, 13 Drawing Sheets

(56) References Cited

OTHER PUBLICATIONS

Oracle-Base, Top-N Queries, www.oracle-base.com/articles/misc/top-n-queries, 2020.
Quick Tip: Oracle Database 12c Makes Top-N, Inner-N, and Bottom-N Querying Easier, community.oracle.com/docs/DOC-995907, 2016.
MySQL 8.0 Reference Manual, 13.2.10 Select Statement, dev.mysql.com/doc/refman/8.0/en/select.html, 2020.
Teradata, SQL Data Manipulation Language, Chapter 1, Top n, Jul. 2015, docs.teradata.com/reader/2_MC9vCtAJRIKIe2Rpb0mA/frQm7Rn09FJZZLQAuaUvJA.
Teradata, SQL Functions, Operators, Expressions, and Predicates, Chapter 22, Ordered Analytical / Window Aggregate Functions, Oct. 2015, docs.teradata.com/reader/kmuOwjp1zEYg98JsB8fu_A/BPCFNfnkMty7lmxikLaOiA.

\* cited by examiner

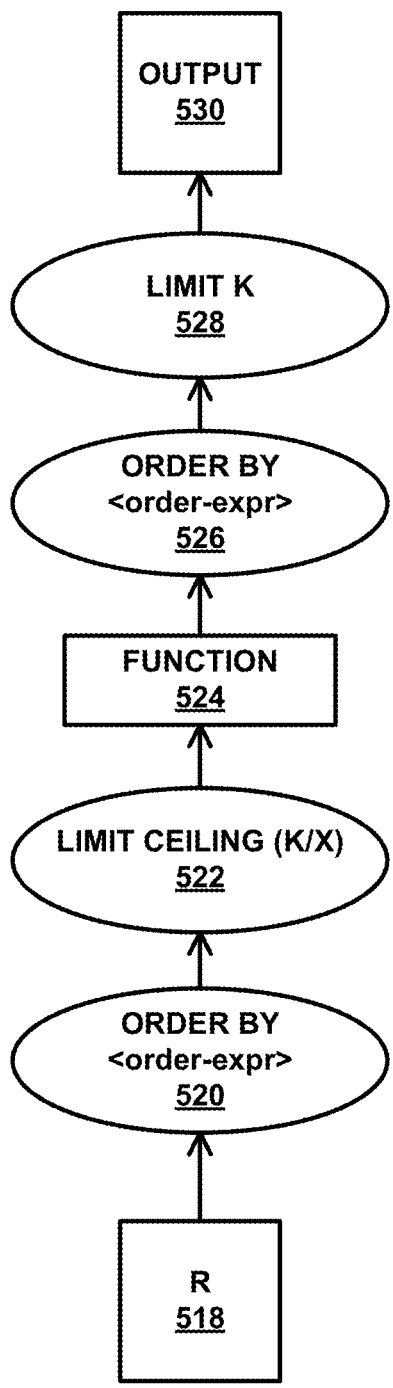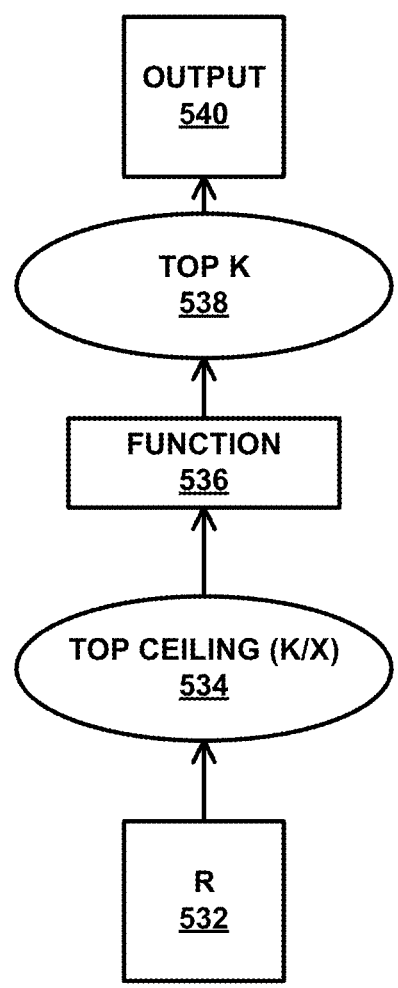
*FIG. 5C*  *FIG. 5D*

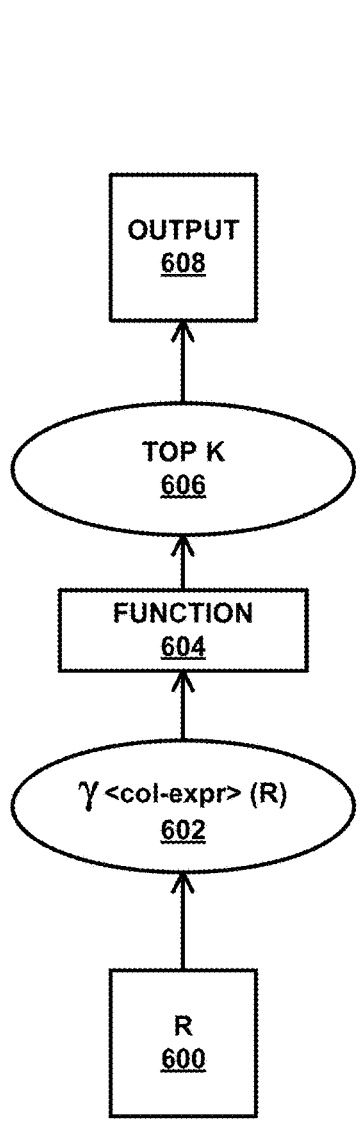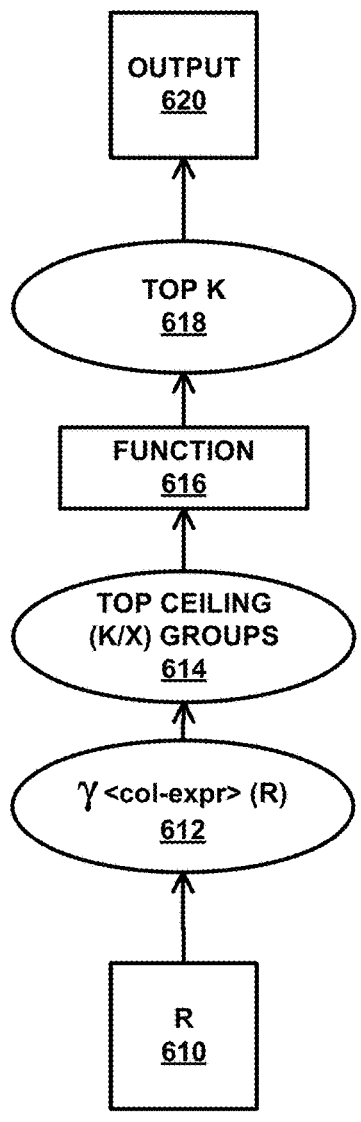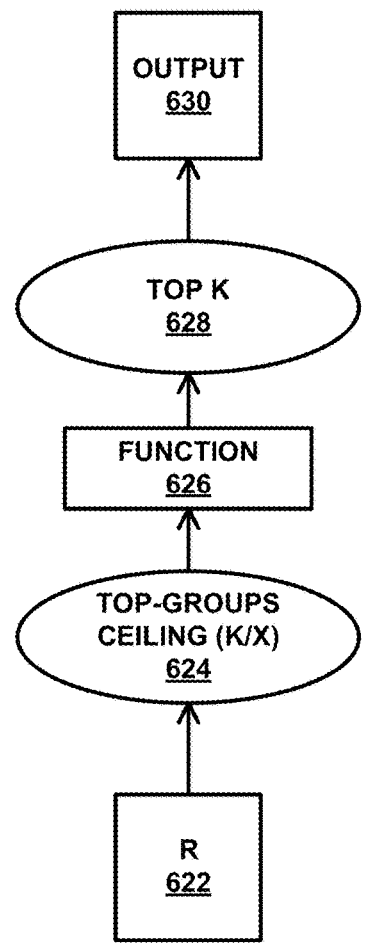
FIG. 6A                    FIG. 6B                    FIG. 6C

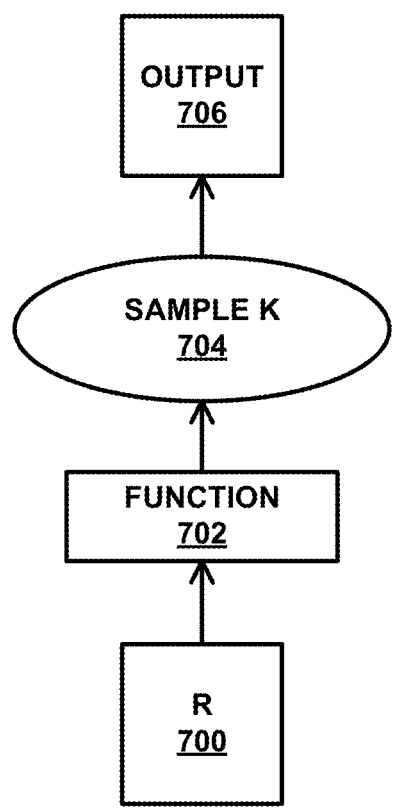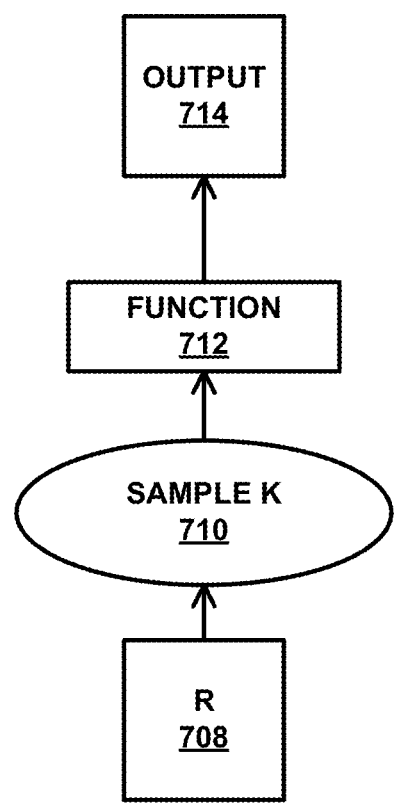
*FIG. 7A*  *FIG. 7B*

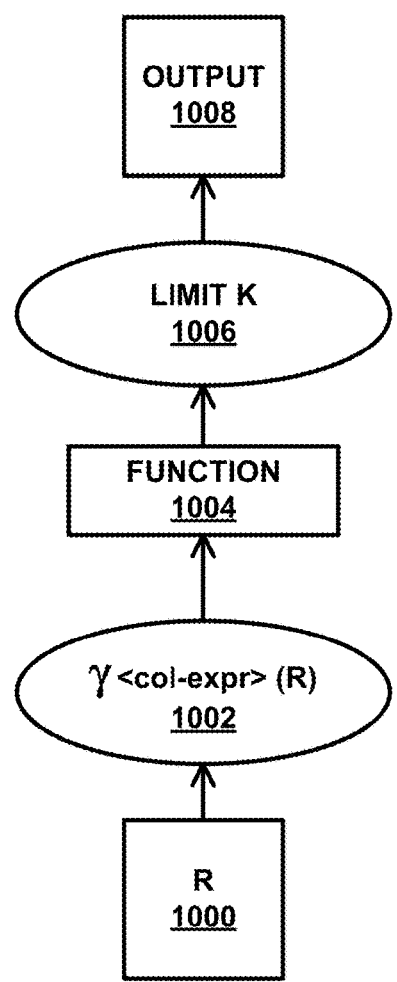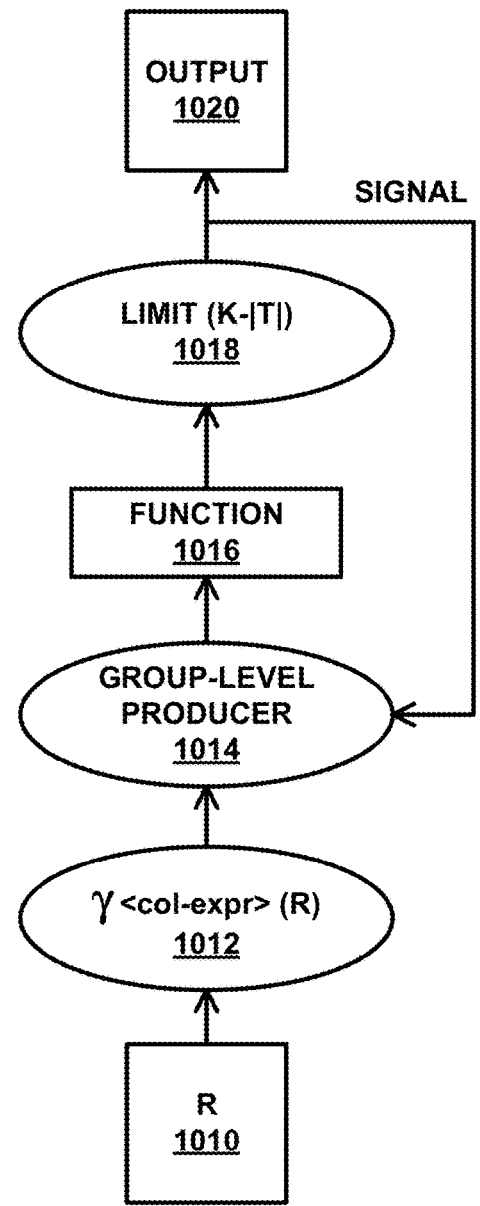
*FIG. 10A*  *FIG. 10B*

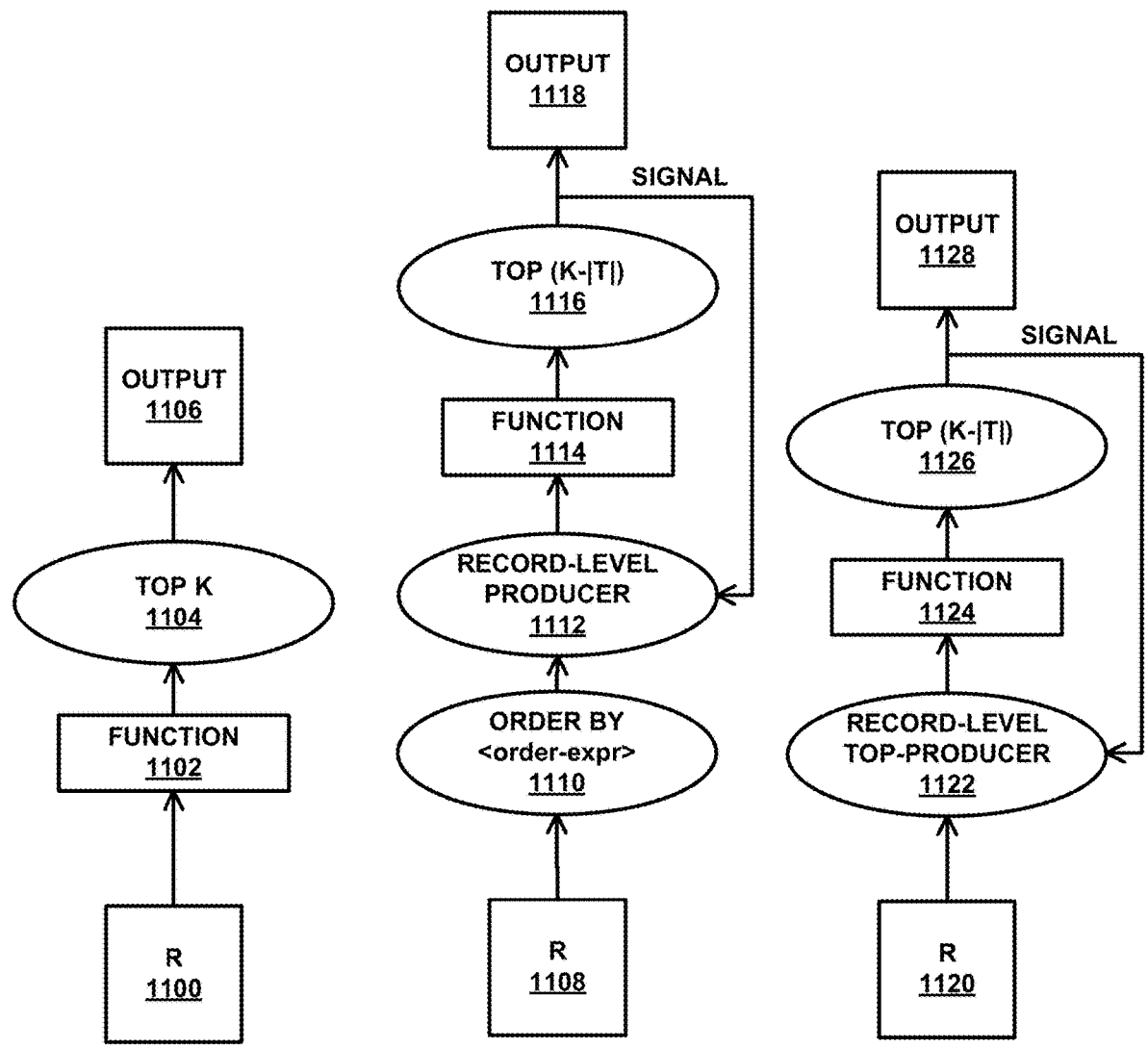
*FIG. 11A*   *FIG. 11B*   *FIG. 11C*

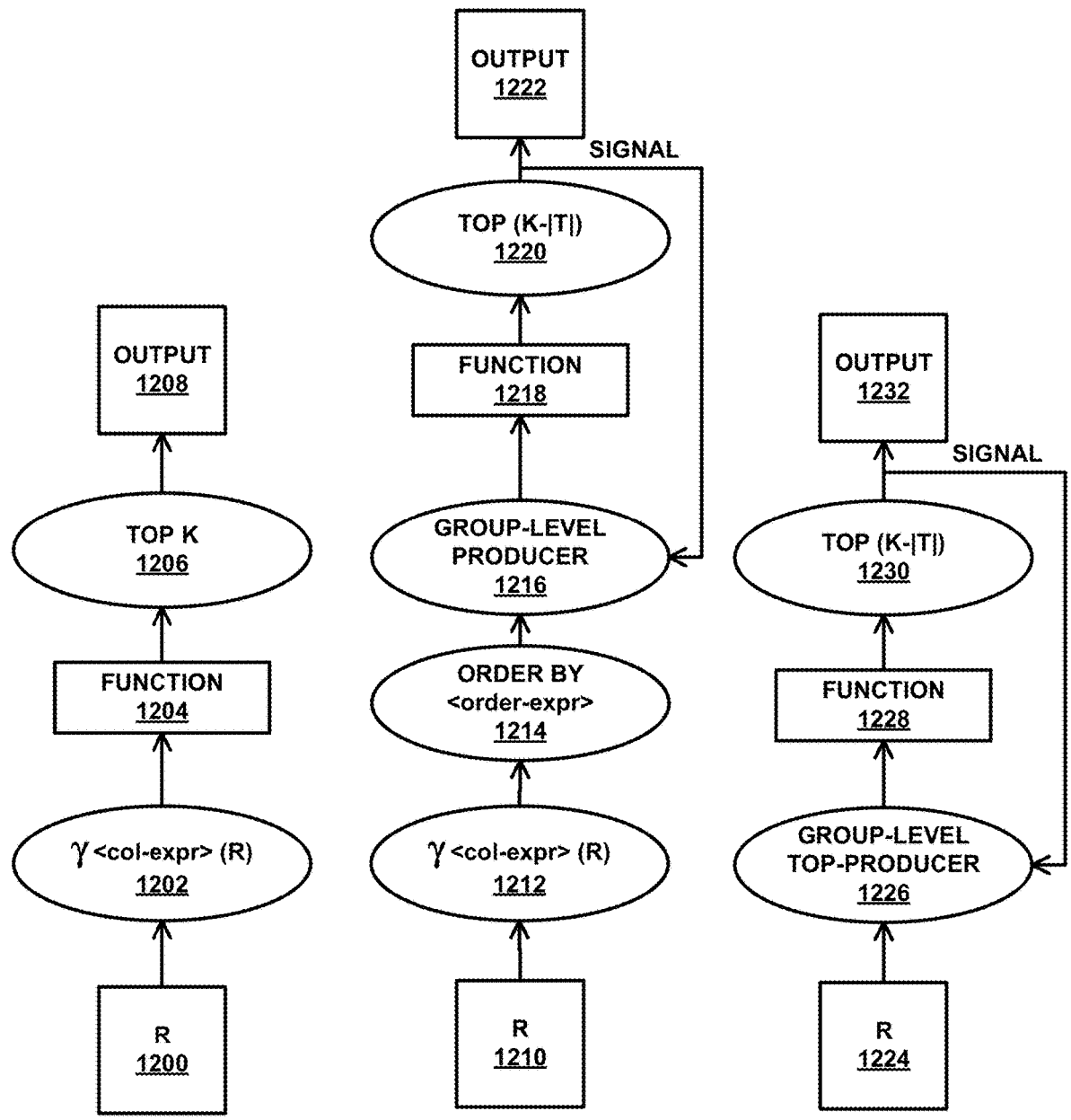
*FIG. 12A*  *FIG. 12B*  *FIG. 12C*

OPTIMIZING LIMIT QUERIES OVER ANALYTICAL FUNCTIONS

CROSS REFERENCE TO RELATED APPLICATION

This application claims the benefit under 35 U.S.C. Section 119(e) of the following co-pending and commonly-assigned application:

U.S. Provisional Patent Application Ser. No. 63/035,460, filed on Jun. 5, 2020, by Mohamed Ahmed Yassin Eltabakh, Mahbub Hasan, Awny Kayed Al-Omari, and Mohammed Al-Kateb, and entitled "OPTIMIZING LIMIT QUERIES OVER ANALYTICAL FUNCTIONS;"

which application is incorporated by reference herein.

BACKGROUND OF THE INVENTION

1. Field of the Invention

This invention relates to methods and systems for optimizing limit queries over analytical functions.

2. Description of Related Art (Note: This application references a number of different publications and patents as indicated throughout the specification by one or more reference numbers within brackets [x]. A list of these different publications and patents ordered according to these reference numbers can be found below in the section entitled "References." Each of these publications and patents is incorporated by reference herein.)

Relational DataBase Management Systems (RDBMS) using a Structured Query Language (SQL) interface are well known in the art. The SQL interface has evolved into a standard language for RDBMS software and has been adopted as such by both the American National Standards Institute (ANSI) and the International Standards Organization (ISO).

In an RDBMS, all data is externally structured into tables. A table in a relational database is typically two dimensional, consisting of rows and columns. A user query selects some or all rows of the table by statements specifying clauses that qualify the rows to be retrieved based on the values in one or more of the columns.

The SQL interface allows users to formulate relational operations on the tables either interactively, in batch files, or embedded in host languages. Operators invoked by clauses in SQL allow the user to manipulate the data, wherein each operator performs functions on one or more tables and produces a new table as a result. The power of SQL lies on its ability to link information from multiple tables or views together to perform complex sets of procedures with a single statement.

One of the most common SQL queries executed by an RDBMS is a SELECT statement including various clauses and expressions. In the SQL standard, the SELECT statement generally comprises the format: "SELECT <expression> FROM <expression> WHERE <expression> GROUP BY <expression> HAVING <expression> ORDER BY <expression>." The clauses generally must follow this sequence, but only the SELECT statement and FROM clause are required.

Generally, the result of an SQL query is a subset of data retrieved by the RDBMS from one or more existing tables stored in the relational database, wherein the FROM clause identifies the name of the table or tables from which data is being selected. The subset of data is a result set, which may be represented as a table.

A limit query is a common type of SQL query that involves an additional clause, typically referred to as "LIMIT", "SAMPLE", or "TOP", depending on semantics and the database vendor. The limit query limits the number of final output records to a specific number or percentage from a possibly larger result set. Various techniques have been proposed to optimize limit queries over standard SQL operators, for example, by possibly stopping further processing once the desired output is created.

However, there is a need in the art for improved methods and systems for optimizing limit queries over analytical functions. The present invention satisfies this need.

SUMMARY OF THE INVENTION

The present invention is directed to an RDBMS that optimizes limit queries over analytical functions, wherein the limit queries include an output clause comprising a LIMIT, TOP and SAMPLE clause with an expression specifying a limit that is a number K or a percentage $\alpha$ %. The optimizations of the limit queries include: (1) static compile-time optimizations, and (2) dynamic run-time optimizations, based on semantic properties of "granularity" and "input-to-output cardinality" for the analytical functions.

BRIEF DESCRIPTION OF THE DRAWINGS

Referring now to the drawings in which like reference numbers represent corresponding parts throughout:

FIGS. 3A, 3B, 4A, 4B, 4C, 5A, 5B, 5C, 5D, 6A, 6B, 6C, 7A, 7B, 8A, 8B, 8C, 9A, 9B, 10A, 10B, 11A, 11B, 11C, 12A, 12B and 12C are tree representations of query execution plans for various queries.

DETAILED DESCRIPTION OF THE PREFERRED EMBODIMENT

In the following description of the preferred embodiment, reference is made to the accompanying drawings, which form a part hereof, and in which is shown by way of illustration a specific embodiment in which the invention may be practiced. It is to be understood that other embodiments may be utilized and structural changes may be made without departing from the scope of the present invention.

Overview

In this invention, novel methods and systems are presented for optimizing limit queries over analytical functions. Specifically, this invention optimizes SQL queries that include analytical functions with an output clause comprising a LIMIT, TOP and SAMPLE clause with an expression specifying a limit that is a number K or a percentage $\alpha$ %.

The present invention proposes optimizations of limit queries at two different levels: (1) static compile-time optimizations for the cases where the minimal number of input records to be processed can be calculated before the execution phase, and (2) dynamic run-time optimizations for the cases where the compile-time optimizations is not applicable.

An assessment of benchmarks and performance comparisons reveal that early elimination of any irrelevant data is critical for performance enhancements. This innovation helps achieving this goal of the class of analytical-limit queries.

These and other aspects of the present invention are described in more detail below.

Figure 1:
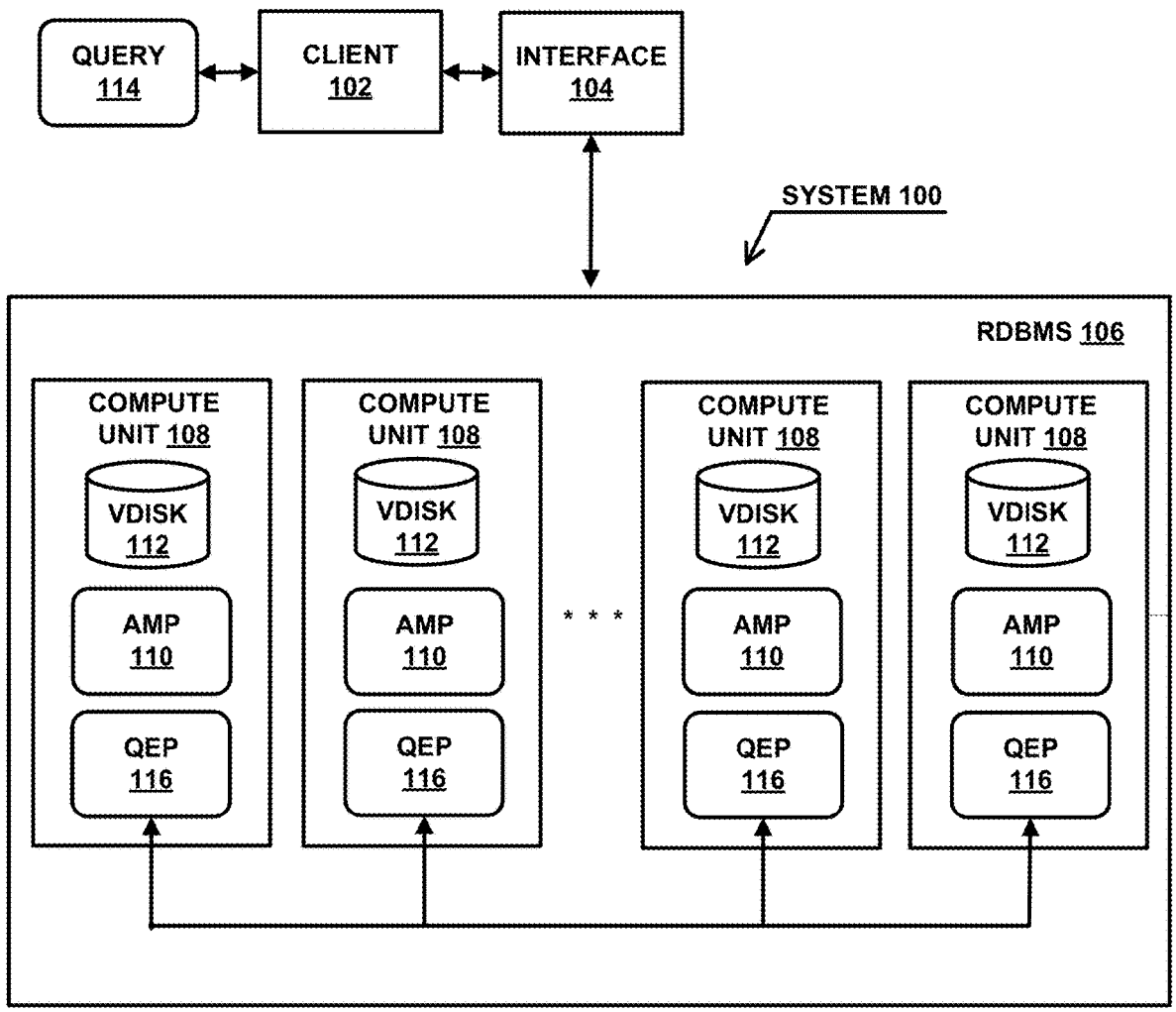
FIG. 1 illustrates an exemplary hardware and software environment according to one embodiment of the present invention.

Hardware and Software Environment FIG. 1 illustrates an exemplary hardware and software environment according to one embodiment of the present invention. In the exemplary environment, a computer system 100 implements a data warehouse in a three-tier client-server architecture, wherein the first or client tier provides clients 102 that may include, inter alia, a graphical user interface (GUI), the second or middle tier provides an interface 104 for interfacing with the data warehouse, and the third or server tier comprises the data warehouse, which is a Relational DataBase Management System (RDBMS) 106 that stores data and metadata in a relational database.

The first, second, and third tiers may be implemented in separate computers, or may be implemented as separate or related processes in a single computer.

In the preferred embodiment, the RDBMS 106 is executed by one or more compute units 108, e.g., processors, in the computer system 100, wherein the RDBMS 106 manages a relational database comprised of one or more tables stored on one or more data storage devices connected to the computer system 100. In one embodiment, the computer system 100 is comprised of one or more access module processors (AMPs) 110 performing the functions of the RDBMS 106 and one or more virtual disks (VDISKs) 112 storing the relational database of the RDBMS 106. The AMPs 110 and VDISKs 112 may be implemented in separate processors, or may be implemented as separate or related processes in a single processor.

The RDBMS 106 used in the preferred embodiment comprises the Teradata® RDBMS sold by Teradata™ US, Inc., the assignee of the present invention, although other DBMS's could be used. In this regard, Teradata® RDBMS is a hardware and software based data warehousing and analytic application/database system.

Generally, operators or users of the system 100 interact with the clients 102 to formulate a workload comprised of one or more queries 114 for the RDBMS 106, wherein the requests are transmitted via the interface 104 to the RDBMS 106, and responses are received therefrom. The RDBMS 106 performs the workload comprised of one or more queries 114 against a relational database comprised of one or more tables storing data. Specifically, the RDBMS 106 performs the functions described below, including accepting the workload comprised of the queries 114, generating one or more query execution plans (QEPs) 116 from the queries 114, and then performing the query execution plans 116 to process data retrieved from the tables. Moreover, the results from these functions may be provided directly to clients 102, or may be provided to other systems (not shown) by the interface 104, or may be stored by the RDBMS 106 in the relational database.

Note that, in one or more embodiments, the system 100 may use any number of different parallelism mechanisms to take advantage of the parallelism offered by the multiple tier architecture, the client-server structure of the client 102, interface 104, and RDBMS 106, as well as the multiple compute nodes 108, AMPs 110 and VDISKs 112. Further, data within the relational database may be partitioned across the compute units 108, AMPs 110 and VDISKs 112 to provide additional parallelism.

In one embodiment, each of the compute units 108 manages a portion of the database that is stored in a corresponding one of the VDISKs 112. For example, the rows and/or columns of tables stored in the VDISKs 112 may be partitioned across the compute units 108 to ensure that workloads are distributed evenly across the compute nodes 108. The RDBMS 106 organizes the storage of data and the distribution of rows and/or columns of tables among the compute nodes 108. The RDBMS 106 also coordinates the execution of the query execution plans 116 by the AMPs 110, and the retrieval of data from the VDISKs 112, in response to the queries 114 received from the clients 102.

Generally, the clients 102, interface 104, RDBMS 106, compute units 108, AMPs 110 and VDISKs 112 comprise hardware and/or software, including logic and/or data tangibly embodied in and/or accessible from a device, media, carrier, or signal, such as RAM, ROM, one or more of the data storage devices, and/or a remote system or device communicating with the computer system 100 via one or more data communications devices. The above elements 102-112 and/or operating instructions may also be tangibly embodied in memory and/or data communications devices, thereby making a computer program product or article of manufacture according to the invention. As such, the terms "article of manufacture," "program storage device" and "computer program product" as used herein are intended to encompass a computer program accessible from any computer readable device or media. Accordingly, such articles of manufacture are readable by a computer and embody at least one program of instructions executable by a computer to perform various method steps of the invention.

However, those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

Query Processing

Figure 2:
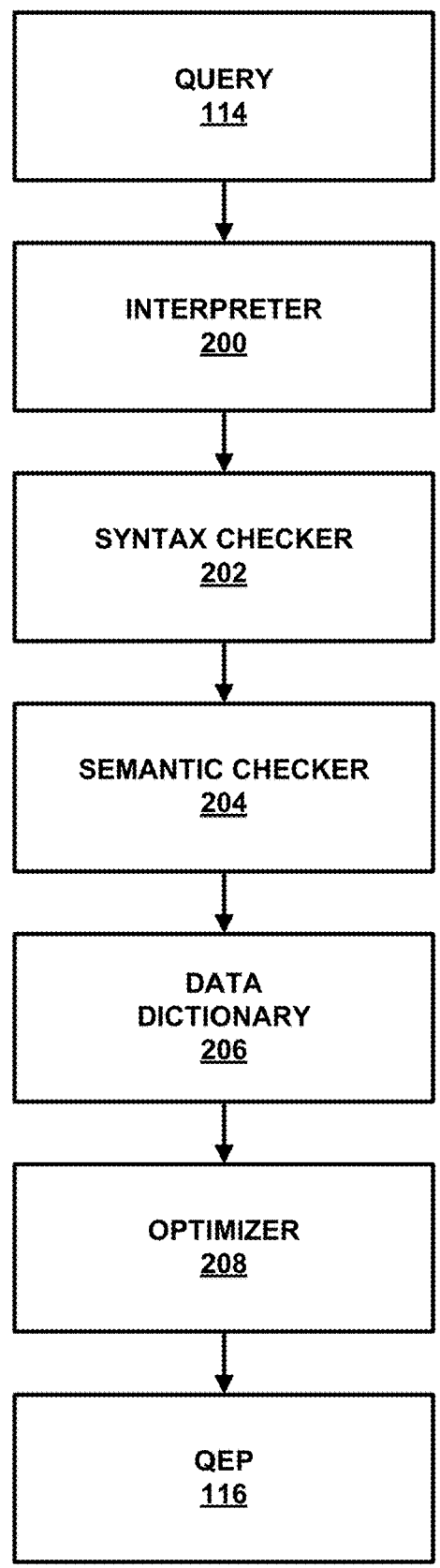
FIG. 2 illustrates the steps or functions performed by a relational database management system when processing a query according to one embodiment of the present invention.

FIG. 2 illustrates the steps or functions performed by the RDBMS 106 when processing a query 114, which typically comprises one or more data manipulation language (DML) statements, such as an SQL query. An interpreter 200 interprets the query 114, a syntax checker 202 checks the query 114 for proper syntax, a semantic checker 204 evaluates the query 114 semantically, and consults a data dictionary 206 to ensure that all of the objects specified in the query 114 actually exist and that the user has the authority to perform the query 114. Finally, an optimizer 208 selects one or more query execution plans 116 for the query based on cost profiles, in order to execute an optimal query execution plan 116 for the query.

In one or more embodiments of this invention, the optimizer 208 performs the step or function of optimizing a limit query 114 over an analytical function in the RDBMS 106, wherein the analytical function is provided one or more input records stored in one or more of the tables of the relational database, the limit query 114 specifies how many output records from the analytical function to return as a result set, and the optimizing step or function determines how many of the input records are provided to the analytical function to obtain the output records specified by the limit query 114. Moreover, the optimizing step or function comprises minimizing the input records provided to the analytical function to obtain the output records specified by the limit query 114. This functionality is described in more detail below.

Optimizing Limit Queries

1. Introduction

As noted above, a limit query 114 is a common type of SQL query that involves an additional clause, typically referred to as "LIMIT", "TOP" or "SAMPLE," depending on semantics and the database vendor. The limit query 114 limits the number of final output records to a specific number or percentage from a possibly larger output set. Various techniques have been proposed to optimize limit queries 114 over standard SQL operators, for example, by possibly stopping further processing once the desired output is created.

This invention goes beyond the standard SQL operators, and provides improved techniques for optimizing limit queries 114 over analytical functions. This is both critical and innovative due to the following reasons:

(1) With the increased trend of integrating analytical functions within the RDBMS 106, it is inevitable to have limit queries 114 applied over the output of analytical functions.

(2) Unlike standard SQL operators, the semantic properties of analytical functions are by default unknown, which makes optimizing limit queries 114 over analytical functions more challenging.

(3) Most analytical functions are inherently expensive, e.g., have time and space complexity that may go far beyond linear, and thus if their entire output is not needed, then it is significantly critical to pass the minimal input set that would generate the desired output. This is especially true if the analytical functions are remote (external to the RDBMS 106) and there is an involved data transfer.

(4) The proposed optimizations result in value-added benefits to customers' workloads in terms of faster execution time, better resource utilization, less disk I/O's and spooling, less data transfer, and higher concurrency.

These solutions to these problems are applicable to a variety of different database systems 100, including both open-source and commercial database systems 100.

2. Problems Solved by the Invention

This invention optimizes SQL queries 114 that involve a LIMIT clause on the output from an invoked analytical function.

Consider the following query 114:

```
SELECT <projection list>
FROM AnalyticalFunction(
    ON PrimaryInputTable(R)
    ON dimensionTable1
    ON dimensionTable2
    ...
) AS Q;
[LIMIT | TOP | SAMPLE | ...] [<K | α%>];
```

The SELECT statement returns a result set of records, comprising a set of one or columns specified the <projection list>. The FROM clause specifies the source of the data, in this example, the analytical function labeled as Analytical-Function, which may comprise a user-defined function (UDF), stored procedure (SP), built-in function, etc., of the RDBMS 106. The analytical function accepts PrimaryInputTable (R) as a primary input table or relation, as well as dimensionTable1 and dimensionTable2 as dimension tables or relations, wherein the ON clauses specify join conditions. The AS command is used to rename the result set of records as a table with an alias, in this example, Q. The limit query 114 may also include a number of alternative clauses represented within the brackets, wherein the vertical bars represent an "and/or", namely, a LIMIT, TOP, and/or SAMPLE, . . . , clause with an expression K or α %.

For convenience, this type of limit query 114 is referred to as an "analytical-limit" query 114. Analytical-limit queries 114 are very practical and common in customers' workloads, mostly due to the increased integration of analytical functions within the database systems 100. Analytical-limit queries 114 can be used to sample from a possibly very large output, or to report a few top records with respect to specific ordering criteria. The invoked analytical functions can be either local, i.e., executed within the database system 100, or remote, executed in another analytical system. The analytical functions in this context receive their input(s) as entire datasets (tables), in contrast to the typical record-level UDFs.

There are few variations of the LIMIT clause, which imply different semantics. As illustrated in the above query 114, the three most-common semantics are referred to as "LIMIT", "SAMPLE", and "TOP", which will be precisely defined in Section 3 below. The applied limit can be an expression comprising either an absolute number, e.g., reporting K=100 records, or a percentage, e.g., reporting α=5% of the input size.

The proposed optimizations in this invention focus on pushing the analytical function's output clauses to the analytical function's input, i.e., applying the output clause to the PrimaryInputTable(R) in the above query 114, if and when possible. The input to the analytical function, namely PrimaryInputTable(R) in the above query 114, can be either a base relation or a derived table produced from any arbitrary SQL query. The expectation behind these optimizations is to minimize the number of input records passed to the analytical function to only those necessary and sufficient to produce the desired output records. By doing so, the performance benefits highlighted in Section 1 are achieved.

Applicability to Various Database Systems

The addressed problem is applicable to various database systems 100. Existing database systems 100, either open-source or commercial, including SQL Server™, DB2™ Oracle™, PostgreSQL™, and many others, support different variations of the analytical-limit queries 114.

Different database systems 100 support the limit queries 114 with different variations, e.g., different database systems 100 may support subsets of the three highlighted semantics [1, 2, 3, 4, 5]. Also, the naming and syntax of the clauses can be slightly different. However, the proposed concepts and optimizations apply independent of these variations.

However, no optimizations are proposed in these database systems 100 because the invoked analytical functions are treated as black boxes. The proposed techniques are also applicable to other table (data frame) based analytics libraries, such as R Dplyr™ and Python Pandas™, where similar limit and top semantics are applicable and frequently used.

State-of-the-Art Technologies

Runtime optimizations for LIMIT clauses exist in systems that pipeline operations, e.g., Postgres™ and SQL/MX™. In such systems, once a corresponding LIMIT operator generates the desired output size, it can issue a cancel or stop signal to a child producer operator which cascades this stop signal down a query tree. However, such a solution is only limited to systems that support pipelined execution in which child producer operators are not blocking operators. Otherwise, the operator requires loading the entire input dataset (or a substantial part of it) before generating the first output row. Moreover, even when a runtime cancel propagation is issued, it is often that the input operators in the query tree have performed considerable amount of extra processing (that could have been avoided) by the time the cancellation is received and processed. For example, in the addressed "analytical-limit" query class, the analytical functions are black boxes and hence blocking in nature. Therefore, the pipelined optimization is not applicable since no records will reach the LIMIT operator until the function consumes and executes on the entire input.

Massively parallel processing (MPP) systems, such as the Teradata® RDBMS, also apply some optimizations over the LIMIT clauses for distributed processing. For example, in the Teradata® RDBMS, a load distribution optimization is applied whenever possible to distribute the work among the execution tasks, and then a final step prepares the desired output. Still, these optimizations cannot be applied over black box functions. Similarly, in the Teradata® RDBMS, optimizations for LIMIT K (also known as ANY K) over UNION ALL views and derived tables have been proposed by pushing the LIMIT operator to the UNION ALL branches. As mentioned above, all of these optimizations are proposed in the context of the well-defined SQL operators and do not extend to the class of analytical-limit queries 114.

In terms of optimizing analytical functions within SQL queries 114, the Collaborative Optimizer™ technology in the Teradata® RDBMS is the state of art in this domain [6]. It allows for capturing some of the function's semantic properties in a metadata object, referred to as "function descriptor", and these properties can be then used to enable some optimizations such as "projection push", which entails eliminating un-necessary columns from the function's input before its execution, and "predicate push", which entails pushing post-function predicates to the function's input whenever possible. No other system in the market offer such semantic-driven optimizations. However, the Collaborative Optimizer™ is not currently equipped with techniques for optimizing LIMIT clauses.

Finally, Ordered Analytical Functions™ are functions supported by some databases systems, such as the Teradata® RDBMS, that allow processing the input records in a certain order and computing aggregations over groups of ordered records [7], e.g., continuous sum over a window of records. Ordered Analytical Functions™ have well-defined semantics that are known to the database engine, and hence corresponding applicable optimizations are embedded for their processing in the optimizer 208.

In contrast, the proposed invention addresses LIMIT queries 114 over generic black box analytical functions.

3. Embodiments of the Invention

3.1 Definitions

As mentioned in Section 2, the present invention considers three variations of limit queries 114. In Table 1 below, the target semantics of these variations are defined.

TABLE 1

The Semantics of the Different Clauses

| Clause Name | Semantics |
| --- | --- |
| LIMIT k \| α% | Selecting any k or α % rows from the output |
| ORDER BY c \| TOP k \| α % | Selecting the top k or α % rows with respect to a specific ordering criterion c defined in the ORDER BY clause |
| SAMPLE k \| α % | Selecting k or α % rows from the output at random such that each row in the output is guaranteed to have the same probably of being selected. That is, the selection has to guarantee some statistical properties. |

The term "analytical function" as used in this invention refers to a broad class of any relation-in-relation-out functions. However, this invention uses this term since analytical functions represent the most important and widely used type of functions under this broader class. The optimization techniques proposed in this invention are not dependent on a specific invocation syntax. For the inputs, each relational table can be either a base or derived table. Only one of the inputs, table R, is the primary table; all other tables are assumed to be auxiliary dimension tables. Whenever applicable and whenever the LIMIT clause can be pushed to the function's input, it will be pushed over the primary input table R, while the dimension tables remain untouched. Therefore, this invention focuses on the primary input table R during processing.

The new query execution plans 116 proposed in this invention are used to expand the possible equivalent plans 116 generated by the optimizer 208, and then the optimizer 208 performs a cost-based selection of the plan 116 having the lowest estimated cost, i.e., the decision is still cost-based. In most cases, it is expected that the new query execution plans 116 proposed in this invention will always be better than (or at least similar to) naive (unoptimized) plans 116.

3.2 Proposed Semantic Properties of the Analytical Function

In order to enable optimizations on the analytical-limit queries 114, this invention proposes maintaining a semantic property of "granularity" and a semantic property of "input-to-output cardinality" for the analytical function for use by the optimizer 208. These properties can be manually defined by a domain expert when creating the function [6], or autonomously learned [8].

The semantic properties are defined as follows:

The semantic property of granularity defines an interdependency among the input records (of the primary relation or input table R) when processed by the analytical function, such that:
  when the granularity is "row", that indicates that the analytical function operates on each of the input records independent of others of the input records, such that, for a given one of the input records r, adding or removing the others of the input records does not affect the output records obtained from the analytical function for the given one of the input records.
  when the granularity is "partition", that indicates that the input records are is partitioned based on a user-defined criteria and that the analytical function operates on each partition independent of other partitions, such that, for a given partition $p=\{r_1, r_2, r_m\}$, adding or removing the other partitions does not affect the output records obtained from the analytical function for the given partition.

when the granularity is "other", that indicates that the analytical function does not operate at the granularity of row or partition, such that, the limit query 114 cannot be optimized, and the only possibly query execution plan 116 is a naïve plan.

The semantic property of input-to-output cardinality is a range of [x, y], where x is a minimum value and y is a maximum value, for how many output records are obtained per input record when the granularity is row, and how many output records are obtained per partition when the granularity is partition. Table 2 below provides some examples to illustrate the cardinality property.

TABLE 2

Examples of Input-to-Output Cardinality Property

| Granularity | Input-to-Output Cardinality [min, max] | Description |
| --- | --- | --- |
| Row | [1, 1] | Each input row generates one output row |
| Row | [0, 1] | Each input row generates zero or one output row |
| Row | [0, ∞] | Each input row generates zero or many output rows |
| Partition | [1, 1] | Each input partition generates one output row |
| Partition | [1, 2] | Each input partition generates one to two output rows |
| Partition | [0, ∞] | Each input partition generates zero or many output rows |

3.3 Static Compile-Time Optimizations

This section presents the cases where the optimizing step or function performed by the optimizer 208 comprises a static compile-time optimization of the limit query 114. This is possible because the system 100 can calculate the minimal number of the required input records to generate the desired output size. Such compile-time optimization is very effective in eliminating most (if not all) of the unnecessary processing.

3.3.1 Optimizing a LIMIT Clause with an Expression K

Under the semantics given in Table 1 for the LIMIT clause, the result sets generated with the optimizations enabled or disabled may not be identical, but semantically they are all correct. First, the focus is on the absolute number cases, i.e., reporting K records, and then there is a discussion of the percentage cases.

Case 1: When the granularity is row and the input-to-output cardinality is the range of [x, y], where x≥1
Consider the following query 114:

```
SELECT <projection list>
FROM AnalyticalFunction(
    ON PrimaryInputTable(R)
    ...
) AS Q;
LIMIT K;
```

Figure 3A:
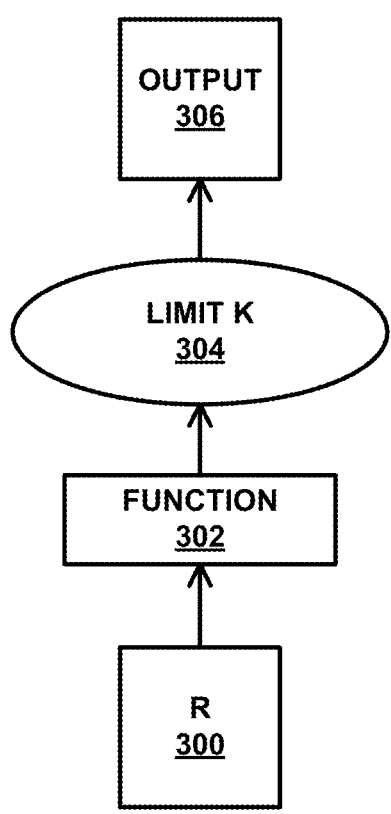
Figure 3B:
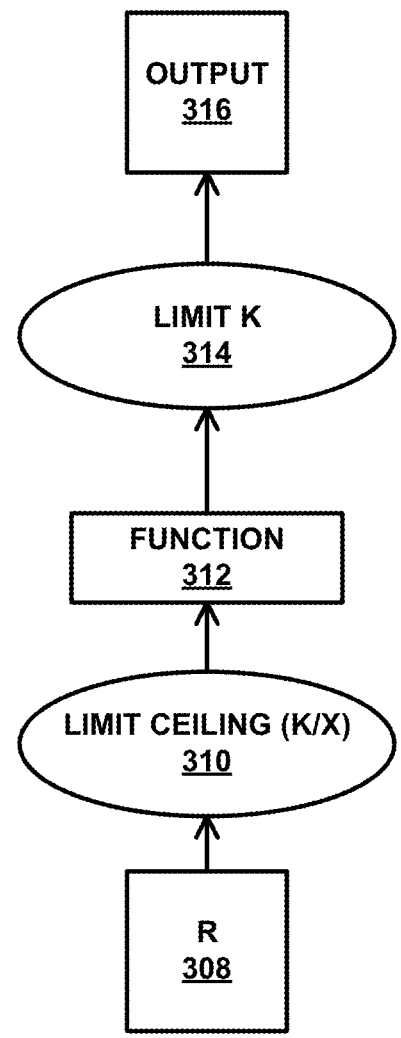

FIGS. 3A and 3B are tree representations of the resulting query execution plans 116.

In a Naïve Plan 116 shown in FIG. 3A, the query 114 executes as written by the user, i.e., the input table R 300 sources input records to an analytical function 302, the function 302 generates its entire output, and then a LIMIT K operator 304 is applied to generate a result set of K output records for output 306.

In an Optimized Plan 116 shown in FIG. 3B, since the function operates at the "row" granularity and each input records produces at least x output records; the query execution plan 116 can be optimized. The input table R 308 sources input records to a LIMIT CEILING operator 310, the LIMIT CEILING operator 310 provides only K/x input records to an analytical function 312, the function 312 generates its entire output, and a LIMIT K operator 314 is optionally applied to the output records from the function 312 to obtain K output records as a result set for output 316 from a possibly a larger set of records (K*y/x).

Case 2: When the granularity is partition and the input-to-output cardinality is the range of [x, y], where x≥1
Consider the following query 114:

```
SELECT <projection list>
FROM AnalyticalFunction(
    ON PrimaryInputTable(R)
        PARTITION BY <col-expr>
    ...
) AS Q;
LIMIT K;
```

In the above query 114, the PARTITION BY clause divides or groups the result set into partitions according to a column expression <col-expr>.

Figure 4A:
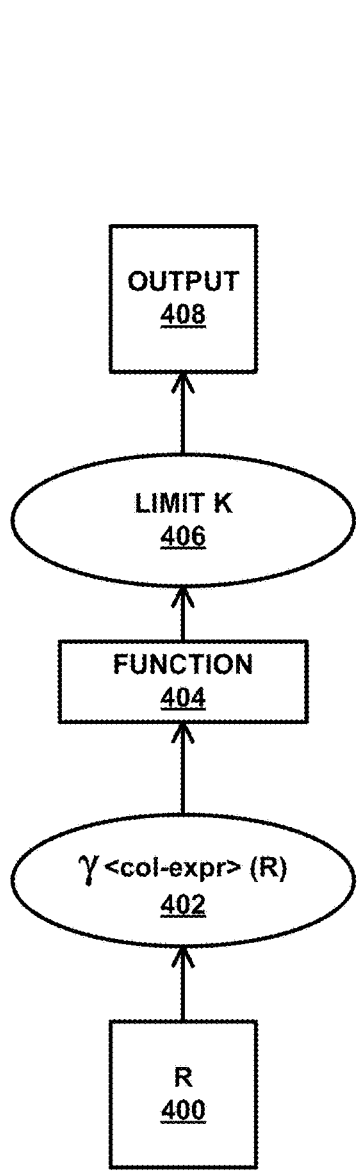
Figure 4B:
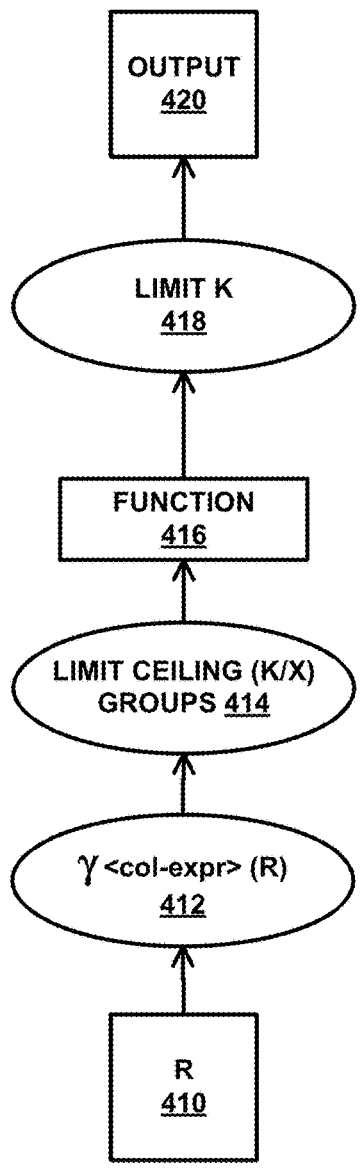
Figure 4C:
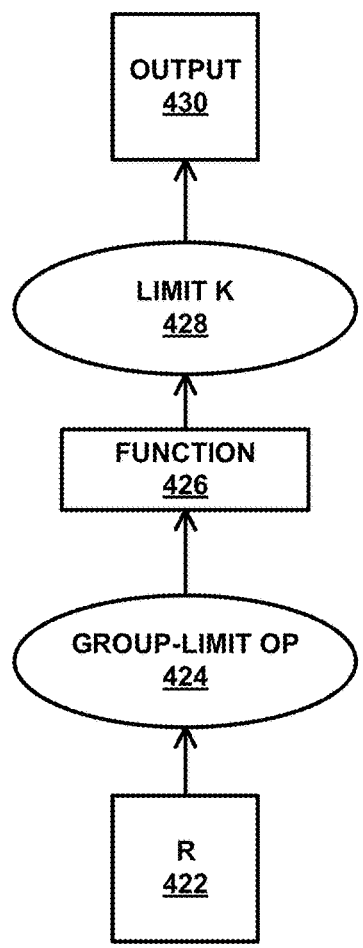

FIGS. 4A, 4B and 4C are tree representations of the resulting query execution plans 116.

In a Naïve Plan 116 shown in FIG. 4A, the query 114 executes as written by the user, i.e., the input table R 400 sources input records to a grouping operator γ 402, the grouping operator γ 402 groups the input records into one or more partitions by a column expression <col-expr>, the partitions are provided to an analytical function 404, the function 404 generates its entire output, and then a LIMIT K operator 406 is applied to the output records from the function 404 to obtain K of the output records as a result set for output 408.

A first Optimized Plan 116 shown in FIG. 4B, proposes pushing a LIMIT CEILING K/x operator on top of a γ grouping operator. The input table R 410 sources the input records to a grouping operator γ 412, the grouping operator γ 412 groups the input records into one or more partitions by a column expression <col-expr>, a LIMIT CEILING operator 414 of K/x is applied to the partitions so that only K/x of the partitions are provided to an analytical function 416, the function 416 generates its entire output, and a LIMIT K operator 418 is optionally applied to the output records from the function 416 to obtain K of the output records as a result set for output 418. Since each group (partition) is guaranteed to generate at least x records, the LIMIT CEILING operator 414 will only select K/x groups (notice that entire groups are selected, not records). Only these groups are provided to the function 416, and then the final LIMIT K operator 418 is applied to the output records from the function 416 to guarantee that only K of the output records are generated as a result set for output 418.

A second Optimized Plan 116 shown in FIG. 4C introduces one further optimization by combining the γ grouping operator 412 and LIMIT CEILING operator 414 of K/x groups from the first Optimized Plan 116 shown in FIG. 4B. The input table R 422 sources the input records to a "GROUP-LIMIT" operator 424, the GROUP-LIMIT operator 424 groups the input records into one or more partitions by a column expression <col-expr>, K/x of the partitions are provided to an analytical function 426, the function 426 generates its entire output, and a LIMIT K operator 428 is applied to the output records from the function 426 to obtain K of the output records as a result set for output 430. Therefore, instead of creating all the groups and then selecting K/x groups, the GROUP-LIMIT operator 424 can only maintain the desired number of groups while discarding all other groups before they get created.

3.3.2 Optimizing a TOP Clause with an Expression K

This optimizing is used when a TOP clause is paired with a preceding ORDER BY clause for selecting a TOP K of the input records with respect to an order expression.

Before discussing the optimizations under the different cases, it is important to highlight that, in the case where the analytical functions are remote from the computer system 100 and executed on a different computer system, the optimizations presented in this section do not assume any "order-preserving" properties about a network layer. If the network layer is order-preserving or if the analytical functions are local within the database system 100, then additional optimizations can be applied.

Case 1: When the granularity is row and the input-to-output cardinality is the range of [x, y], where x≥1

Consider the following query 114:

```
SELECT <projection list>
FROM AnalyticalFunction(
    ON PrimaryInputTable(R)
    ...
) AS Q;
ORDER BY <order-expr>
TOP K;
```

In this case, this invention assumes that the ORDER BY order expression (<order-expr>) is on pass-through columns present in the input table R and does not involve columns generated by the analytical function. Otherwise, no optimizations can be applied.

FIGS. 5A, 5B, 5C and 5D are tree representations of the resulting query execution plans 116.

Figure 5A:
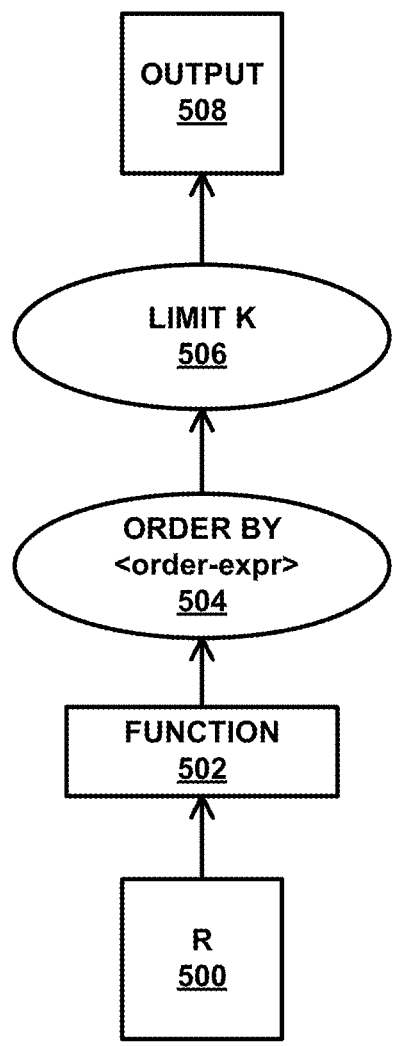

In a first Naïve Plan 116 shown in FIG. 5A, an entire input table R 500 is provided to an analytical function 502, the function 502 generates its entire output, an ORDER BY operator 504 orders the output records from the function 502 by an order expression <order-expr>, and a LIMIT K operator 506 is applied to the output records from the function 502 to obtain K of the output records as a result set for output 508.

Figure 5B:
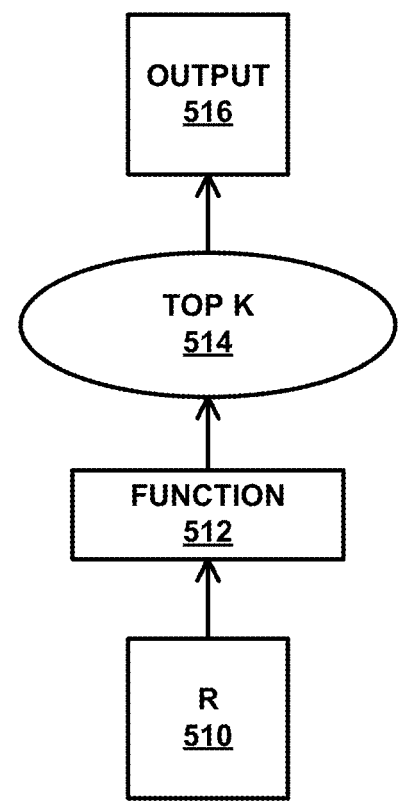

A second Naïve Plan 116 shown in FIG. 5B is similar to the first Naïve Plan 116 shown in FIG. 5A, except that the steps of sorting and selecting a TOP K of the output records are combined into a TOP K operator, which can be implemented more efficiently than the two separate ORDER BY and LIMIT K operators, e.g., by maintaining a priority queue, list or other data structure to only keep the TOP K of the output records. In the second Naïve Plan 116, an entire input table R 510 is provided to an analytical function 512, the function 512 generates its entire output, and a TOP K operator 514 is applied to the output records from the function 512 to obtain a TOP K of the output records according to an order expression <order-expr> as a result set for output 516.

In a first Optimized Plan 116 shown in FIG. 5C, since the function processes each input record independently and each input record is guaranteed to produce at least x>=1 output records, this invention can push the selection of a TOP K of the records before executing the function. This invention only needs to select the first K/x of the input records as indicated in the query execution plan 116. Specifically, in the first Optimized Plan 116, the input table R 518 sources the input records to an ORDER BY operator 520, the ORDER BY operator 520 orders the input records by an order expression <order-expr>, a LIMIT CEILING operator 522 provides only K/x of the input records to an analytical function 524, the function 524 generates its entire output, an ORDER BY operator 526 orders the output records from the function 524 by an order expression <order-expr>, and a LIMIT K operator 528 is applied to obtain only K of the output records as a result set for output 530.

In a second Optimized Plan 116 shown in FIG. 5D, the ORDER BY and LIMIT operators are combined into one TOP K operator for more efficient implementation similar to the second Naïve Plan 116. Specifically, in the second Optimized Plan 116, an input table R 532 sources the input records to a LIMIT CEILING operator 534, the LIMIT CEILING operator 534 provides K/x of the input records to an analytical function 536, the function 536 generates its entire output, and a TOP K operator 538 is applied to the output records from the function 536 to obtain only a TOP K of the output records as a result set for output 540.

Note that, if the output generated by the function is order-preserved, i.e., the output's order is as the input's order, then the first and second Optimized Plan 116 can be further optimized by removing the ordering step on the output of the function (explicit in the first Optimized Plan 116, and implicit in the second Optimized Plan 116) and directly apply a LIMIT operator.

Note also that, for simplicity, in the rest of this disclosure, only the TOP operator is shown, instead of two stacked ORDER BY and LIMIT operators. The TOP operator internally combines the two steps of sorting and then selecting the first K records in the list with possibly a more efficient implementation.

Case 2: When the granularity is partition and the input-to-output cardinality is the range of [x, y], where x≥1

Consider the following query 114:

```
SELECT <projection list>
FROM AnalyticalFunction(
    ON PrimaryInputTable(R)
        PARTITION BY <col-expr>
    ...
) AS Q;
ORDER BY <order-expr>
TOP K;
```

In this case, the analytical function operates on entire partitions (groups) in isolation of each other. This invention assumes that the order expression (<order-expr>) is on the partitioning columns defined in a PARTITION BY clause. These partitioning columns are also assumed to be pass-through columns, wherein the function does not alter or modify their values. Otherwise, no optimizations can be applied.

FIGS. 6A, 6B and 6C are tree representations of the resulting query execution plans 116.

In a Naïve Plan 116 shown in FIG. 6A, the query 114 executes as written by the user, i.e., the input table R 600 sources the input records to a grouping operator γ 602, the grouping operator γ 602 groups the input records into one or more partitions by a column expression <col-expr>, the partitions are provided to an analytical function 604, the function 604 generates its entire output, and a TOP K operator 606 is applied to the output records from the function 604 to sort and select the first K of the output records as a result set for output 608.

A first Optimized Plan 116 shown in FIG. 6B proposes adding a TOP operator (which implicitly involves sorting) above a grouping operator to select a top K/x partitions with respect to an ordering expression <order-expr> on the grouping columns, and to provide the top K/x partitions to a function. Specifically, the input table R 610 sources the input records to a grouping operator γ 612, the grouping operator γ 612 groups the input records into one or more partitions by a column expression <col-expr>, a TOP CEILING operator 614 provides only K/x of the partitions to an analytical function 616, the function 616 generates its entire output, and a TOP K operator 618 is applied to the output records from the function 616 to obtain only a TOP K of the output records as a result set for output 620. The first Optimized Plan 116 limits the number to K/x because each partition is guaranteed to output at least x output records and, since each partition may produce at most y input records, a final TOP K operator is added to obtain only K of the output records as a result set.

A second Optimized Plan 116 shown in FIG. 6C proposes combining grouping and TOP operators into one operator, namely a "TOP-GROUPS" operator, which can be implemented in a more efficient way than two separate grouping and TOP CEILING operators. The input table R 622 sources the input records to a TOP-GROUPS operator 624, the TOP-GROUPS operator 624 groups the input records into one or more partitions by a column expression <col-expr>, only K/x of the partitions are provided to an analytical function 626, the function 626 generates its entire output, and a TOP K operator 628 is applied to the output records from the function 626 to obtain only K of the output records as a result set for output 630. This is certainly possible since the sorting criteria is on the grouping columns as stated in the assumptions above.

Note that, if the output of the function is order-preserved, then the first and second Optimized Plans 116 can be further optimized by removing the ordering step on the output of the function and by replacing the final TOP K operator with a LIMIT K operator.

3.3.3 Optimizing a SAMPLE Clause with an Expression K

According to the semantics highlighted in Table 1 in Section 3.1 above, the SAMPLE clause is distinct from the LIMIT clause in that the SAMPLE clause must preserve the statistical property that each output record has the same probability of being selected. In other words, two equivalent query execution plans 116 may produce different output records, but they both must satisfy the statistical property mentioned above.

Based on this statistical property, optimizations can be only applied for the cases where the input-to-output cardinality has a range of [1,1]. That is, a unit of input to an analytical function (either a "row" or a "partition" depending the granularity semantic property) is guaranteed to produce a single output record. Only in this case, the SAMPLE clause can be pushed to the input of the function while still preserving the statistical property. In all other cases, the probability distribution over the output records cannot be preserved unless the output is entirely generated.

Case 1: When the granularity is row and the input-to-output cardinality is the range of [x, y], where x=y=1

Consider the following query 114:

```
SELECT <projection list>
FROM AnalyticalFunction(
    ON PrimaryInputTable(R)
    ...
) AS Q;
SAMPLE K;
```

FIGS. 7A and 7B are tree representations of the resulting query execution plans 116.

In a Naïve Plan 116 shown in FIG. 7A, the query 114 executes as written by the user, i.e., the input table R 700 sources the input records that are provided to an analytical function 702, the function 302 generates its entire output, and then a SAMPLE K operator 704 is applied to the output records from the function 702 to obtain K of the output records as a result set for output 706.

In an Optimized Plan 116 shown in FIG. 7B, each input record in $R=\{r_1, r_2, r_n\}$ is guaranteed to generate a single record in the output $O=\{o_1, o_2, \ldots, o_n\}$ of the function. Therefore, the probability of each $o_i$ to be in the final sample is $1/n$, which is identical to the probability of selecting the corresponding input record $r_i$ and passing it to the function. Hence, the SAMPLE operator can be pushed to the input of the function. Specifically, the input table R 708 sources the input records to a SAMPLE K operator 710, the SAMPLE K operator 710 provides only K of the input records to an analytical function 712, the function 712 generates its entire output, and then K of the output records from the function 712 are obtained as a result set for output 714.

Case 2: When the granularity is partition and the input-to-output cardinality is the range of [x, y], where x=y=1

Consider the following query 114:

```
SELECT <projection list>
FROM AnalyticalFunction(
    ON PrimaryInputTable(R)
        PARTITION BY <col-expr>
    ...
) AS Q;
SAMPLE K;
```

In this case, the function operates on entire partitions (groups) in isolation of each other. This invention assumes that the order expression <order-expr> is on the partition columns defined in the column expression <col-expr> of a PARTITION BY clause. These partitioning columns are also assumed to be pass-through columns, wherein the function does not alter or modify their values. Otherwise, no optimizations can be applied.

Figure 8A:
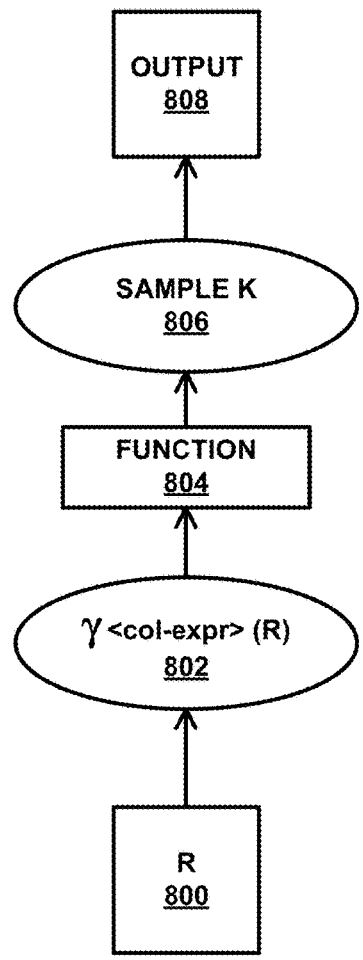
Figure 8B:
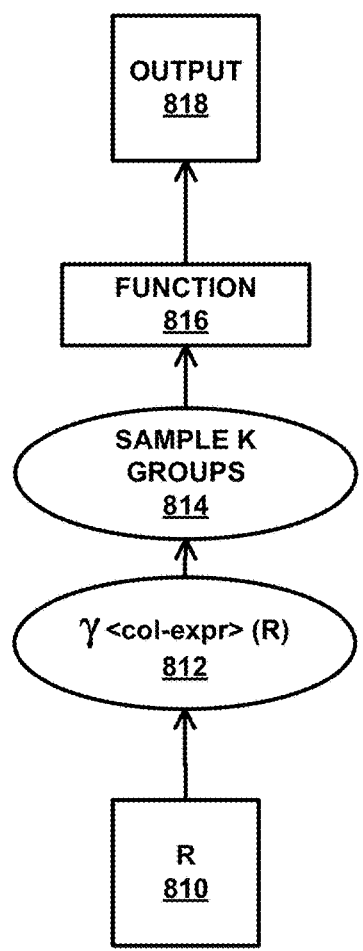
Figure 8C:
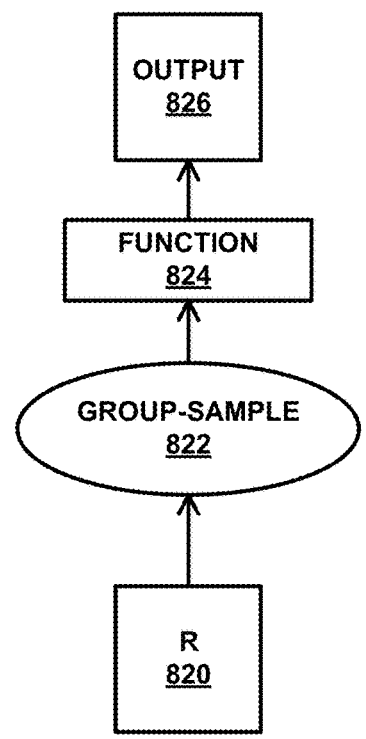

FIGS. 8A, 8B and 8C are tree representations of the resulting query execution plans 116.

In a Naïve Plan 116 shown in FIG. 8A, the query 114 executes as written by the user, i.e., the input table R 800 sources the input records to a grouping operator γ 802, the grouping operator γ 802 groups the input records into one or more partitions by a column expression <col-expr>, the partitions are provided to an analytical function 804, the function 804 generates its entire output, and then a sample K operator 806 is applied to the output records from the function 804 to obtain K of the output records as a result set for output 808.

In a first Optimized Plan 116 shown in FIG. 8B, after a grouping step, assume there are n groups $G=\{g_1, g_2, g_n\}$, and each group is guaranteed to generate a single output record in the output $O=\{o_1, o_2, \ldots, o_n\}$ of the function. Therefore, the probability of each of to be in the final sample is 1/n, which is identical to the probability of selecting the corresponding input group $g_1$ and passing it to the function. Hence, the SAMPLE K operator can be pushed to the input of the function. Specifically, the input table R 810 sources the input records to a grouping operator γ 812, the grouping operator γ 812 groups the input records into one or more partitions by a column expression <col-expr>, a SAMPLE K operator 814 groups K of the partitions so only K of the partitions are provided to an analytical function 816, and the function 816 generates the output records as a result set for output 818.

A second Optimized Plan 116 shown in FIG. 8C is similar to the first Optimized Plan 116, except that it combines the sampling and grouping steps into one "GROUP-SAMPLE" operator. In this case, the second Optimized Plan 116 samples the K desired groups while creating the groups. The only assumption in this plan 116 is that the number of groups is known in advance, i.e., the number of distinct values in the grouping expression, which is column expression <col-expr>, is known. Specifically, the input table R 820 sources the input records to a GROUP-SAMPLE operator 822, the GROUP-SAMPLE operator 822 groups the input records into K partitions by a column expression <col-expr>, only the K partitions are provided to an analytical function 824, and the function 824 generates the output records a result set for output 826.

3.4 Dynamic Run-Time Optimizations

In the cases where the analytical functions may consume some of the input records or the input groups without producing output records, the static compile-time optimizations cannot be applied. This is because, in the worst case, the function may need the entire input to generate the desired output size. Despite that, there is still a good opportunity for dynamic run-time optimizations of the limit queries 114 by the optimizer 208.

The main idea, as will be presented in detail in the following sections, is that a loop or iterator is used with the analytical function to control the input records provided to the function, and to stop the loop or iterator once the necessary output records are obtained as a result set, i.e., input records if the granularity is row and groups or partitions of input records if the granularity is partition. This mechanism can be very effective, especially if the function has a blocking-based implementation even though its nature is not blocking, e.g., third-party supplied functions may not be implemented in the most efficient way. The proposed loop or iterator based strategy also allows for memory consumption optimizations since it limits the number of inputs a function can process in a single batch.

3.4.1 Optimizing a LIMIT Clause with an Expression K

Case 1: When the granularity is row and the input-to-output cardinality is the range of [x, y], where x=0, y>x
Consider the following query 114:

```
SELECT <projection list>
FROM AnalyticalFunction(
    ON PrimaryInputTable(R)
    ...
) AS Q;
LIMIT K;
```

In this case, some input records may not produce any output since x=0. Recall that in the state-of-art runtime pipelined optimization cannot be applied along with black box analytical functions. Nevertheless, this invention leverages the semantic properties to make this combination possible.

Figure 9A:
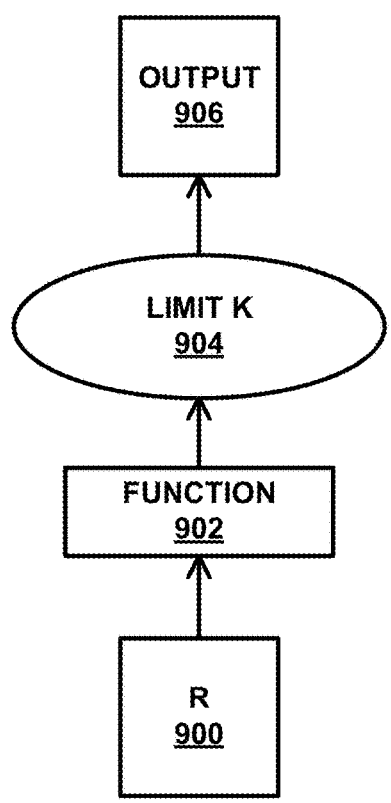
Figure 9B:
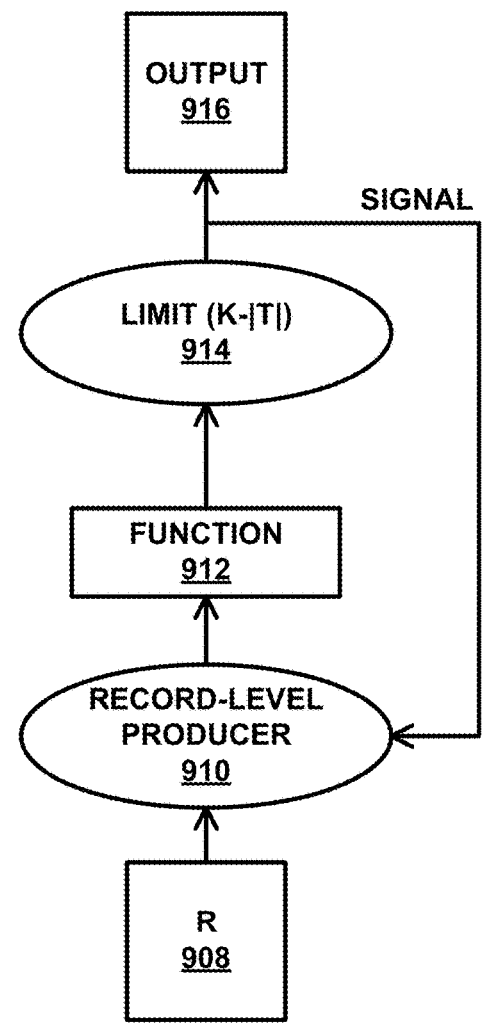

FIGS. 9A and 9B are tree representations of the resulting query execution plans 116.

In a Naïve Plan 116 shown in FIG. 9A, since semantics of the function are a black box and the inter-dependency among the records are unknown, the entire input table R is provided to the function, and then a LIMIT operator is applied on the function's output, i.e., the input table R 900 sources the input records to an analytical function 902, the function 902 generates its entire output, and then a LIMIT K operator 904 is applied to the output records of the function 902 to obtain K of the output records as a result set for output 906.

In an Optimized Plan 116 shown in FIG. 9B, with the known properties of the function, a "RECORD-LEVEL PRODUCER" operator can be added to generate batches of K input records with each invocation. The input table R 908 sources the input records to a RECORD-LEVEL PRODUCER operator 910, the RECORD-LEVEL PRODUCER operator 910 produces K of the input records with each invocation of the loop or iterator, the K input records are provided to an analytical function 912, the function 912 generates its entire output, and a LIMIT (K-|T|) operator 914 is applied to the output records from the function 912 to obtain only T output records as a result set for output 916. Following the LIMIT (K-|T|) operator 914, a signal is generated to the RECORD-LEVEL PRODUCER operator 910 to produce the next K of the input records from R 308 for the function 912. With each iteration of the Optimized Plan 116, the LIMIT operator will limit the output 916 to (K-|T|) of the output records, where the output 916 is initially empty. Once the desired output 916 is generated, a "STOP" signal is sent to the RECORD-LEVEL PRODUCER operator 910 to terminate execution.

Note that the "batch size" of K from the RECORD-LEVEL PRODUCER operator 910 can be of any value. For example, K may have an initial value that is then dynamically adjusted between iterations based on the output rate observed from the function 912. Such parameter tuning is applicable to all cases presented below.

Case 2: When the granularity is partition and the input-to-output cardinality is the range of [x, y], where x=0, y>x
Consider the following query 114:

```
SELECT <projection list>
FROM AnalyticalFunction(
    ON PrimaryInputTable(R)
    PARTITION BY <col-expr>
    ...
) AS Q;
LIMIT K;
```

The main difference between Case 2 and the previous Case 1 is that this invention does not pipeline batches of random records, because that would generate wrong results. Instead, this invention forms groups and then pipelines batches of these groups, i.e., group-level pipelining, which guarantees correct results under an analytical function's semantics. It is worth highlighting that each group must be complete and contain all records belonging to this group. This is critical because, according to the function's semantics, the groups (partitions) are processed independently but there is no assumption regarding the records within each group.

FIGS. 10A and 10B are tree representations of the resulting query execution plans 116.

A Naïve Plan 116 shown in FIG. 10A involves partitioning (grouping) table R based on the partitioning expression defined in the query 114, passing the partitions to a function, and then applying a LIMIT operator on the output of the function, i.e., the input table R 1000 sources the input records to a grouping operator γ 1002, the grouping operator γ 1002 groups the input records into one or more partitions by a column expression <col-expr>, the partitions are provided to an analytical function 1004, the function 1004 generates its entire output, and then a LIMIT K operator 1006 is applied to the output records from the function 1004 to obtain only K of the output records as a result set for output 1008.

In an Optimized Plan 116 shown in FIG. 10B, after partitioning input table R, this invention proposes augmenting a "GROUP-LEVEL PRODUCER" operator, which produces K groups with each invocation as input to the function. Once the desired final output size is reached, a "STOP" signal is sent to the GROUP-LEVEL PRODUCER operator to terminate execution. Specifically, the input table R 1010 sources the input records to a grouping operator γ 1012, the grouping operator γ 1012 groups the input records into one or more partitions by a column expression <col-expr>, a GROUP-LEVEL PRODUCER operator 1014 provides K of the partitions to an analytical function 1016 with each invocation of the loop or iterator, the function 1016 generates its entire output, and a LIMIT (K-|T|) operator 1018 is applied to the output records from the function 1016 to obtain only T of the output records as a result set for output 1020. Following the LIMIT (K-|T|) operator 1018, a signal is generated to the GROUP-LEVEL PRODUCER operator 1014 to produce the next K of the partitions to the function 1016. With each loop or iteration, the LIMIT (K-|T|) operator 1018 will limit the output 1020 to (K-|T|) of the output records, where the output 1020 is initially empty. Once the desired output 1020 of |T| output records is generated, a "STOP" signal is sent to the GROUP-LEVEL PRODUCER operator 1014 to terminate execution.

Note that the "batch size" of K from the GROUP-LEVEL PRODUCER operator 1014 can be of any value. For example, K may have an initial value that is then dynamically adjusted between loops or iterations based on the output rate observed from the function 1016. Such parameter tuning is applicable to all cases presented below.

3.4.2 Optimizing a TOP Clause with an Expression K

Case 1: When the granularity is row and the input-to-output cardinality is the range of [x, y], where x=0, y>x Consider the following query 114:

---

SELECT projection list>
FROM AnalyticalFunction(
    ON PrimaryInputTable(R)
    ...
) AS Q;
ORDER BY <order-expr>
TOP K;

---

This Case is similar to Case 1 in Section 3.3.2, wherein this invention assumes that the order expression <order-expr> is on pass-through columns present in the primary input table R and does not involve columns generated by the function. Otherwise, no optimizations can be applied.

FIGS. 11A, 11B and 11C are tree representations of the resulting query execution plans 116.

In a Naïve Plan 116 shown in FIG. 11A, an entire table R 1100 is provided to an analytical function 1102, the function 1102 generates its entire output, and then a TOP K operator 1104 is applied to the output records from the function 1102 to sort and select the first K of the output records as a result set for output 1106.

In a first Optimized Plan 116 shown in FIG. 11B, an input table R 1108 sources the input records to an ORDER BY operator 1110, the an ORDER BY operator 1110 sorts the input records based on an order expression <order-expr>, a RECORD-LEVEL PRODUCER operator 1112 iteratively provides a next K of the input records to an analytical function 1114 with each invocation of the loop or iterator, the function 1114 generates its entire output, and a TOP (K-|T|) operator 1116 is applied to the output records from the function 1114 to obtain only T output records as a result set for output 1118. Following the TOP (K-|T|) operator 1116, a signal is generated to the RECORD-LEVEL PRODUCER operator 1112 to provide the next K records to the function 1114. When |T|=K, a "STOP" signal is sent to the RECORD-LEVEL PRODUCER operator 1112 to terminate execution.

A second Optimized Plan 116 shown in FIG. 11C is similar to the first Optimized Plan 116 shown in FIG. 11B, except that the producer and ordering operators can be combined into one operator, referred to as a "RECORD-LEVEL TOP-PRODUCER" operator. In this case, a more efficient implementation and data structure can be applied to avoid sorting the entire table R beyond what is needed. The input table R 1120 sources the input records to a RECORD-LEVEL TOP-PRODUCER operator 1122, the RECORD-LEVEL TOP-PRODUCER operator 1122 provides a next K of the input records to an analytical function 1124 with each invocation of the loop or iterator, and a TOP (K-|T|) operator 1126 is applied to the output records from the function 1124 to obtain only T output records as a result set for output 1128. Following the TOP (K-|T|) operator 1126, a signal is generated to the RECORD-LEVEL TOP-PRODUCER operator 1122 to provide the next K of the input records to the function 1124. When |T|=K, a "STOP" signal is sent to the RECORD-LEVEL TOP-PRODUCER operator 1122 to terminate execution.

Case 2: When the granularity is partition and the input-to-output cardinality is the range of [x, y], where x=0, y>x Consider the following query 114:

```
SELECT <projection list>
FROM AnalyticalFunction(
    ON PrimaryInputTable(R)
        PARTITION BY <col-expr>
    ...
) AS Q;
ORDER BY <order-expr>
TOP K;
```

This Case is similar to Case 2 in Section 3.3.2, wherein an analytical function operates on a partition-by-partition basis, where each partition may generate as output from the function zero, one, or more records. It is assumed that the order expression <order-expr> is on the partitioning pass-through columns, otherwise the proposed re-writes are not applicable.

FIGS. 12A, 12B and 12C are tree representations of the resulting query execution plans 116.

In a Naïve Plan 116 shown in FIG. 12A, an input table R 1200 sources the input records to a grouping operator γ 1202, the grouping operator γ 1202 groups the input records into one or more partitions by a column expression <col-expr>, the partitions are provided to an analytical function 1204, the function 1204 generates its entire output, and then a TOP K operator 1206 is applied to the output records from the function 1204 to sort and then select a TOP K of the output records as a result set for output 1208.

In a first Optimized Plan 116 shown in FIG. 12B, a sorting operator is pushed to the input of the function to sort the partitions based on an order expression <order-expr>. Then, a "GROUP-LEVEL PRODUCER" operator passes batches of K partitions to the function with each invocation of the loop or iterator. The loop or iterator continues until the desired output size is reached. Note that compared to the Naïve Plan 116 shown in FIG. 12A, if the function is expensive, e.g., quadratic or cubic in the input size and possibly consumes significant resources, then the first Optimized Plan 116 may outperform the Naïve Plan 116. As noted in Section 3.1 above, the decision is ultimately cost-based.

Specifically, the input table R 1210 sources the input records to a grouping operator γ 1212, the grouping operator γ 1212 groups the input records into one or more partitions by a column expression <col-expr>, an ORDER BY operator 1214 sorts the partitions based on an order expression <order-expr>, a GROUP-LEVEL PRODUCER operator 1216 iteratively provides a next K of the partitions to an analytical function 1218 with each invocation of the loop or iterator, the function 1218 generates its entire output, and a TOP (K-|T|) operator 1220 is applied to the output records from the function 1218 to obtain only T output records as a result set for output 1222. Following the TOP (K-|T|) operator 1220, a signal is generated to the GROUP-LEVEL PRODUCER operator 1216 to provide the next K of the input records to the function 1218. When |T|=K, a "STOP" signal is sent to the GROUP-LEVEL PRODUCER operator 1216 to terminate execution.

A second Optimized Plan 116 shown in FIG. 12C is similar to the first Optimized Plan 116 shown in FIG. 12B, except that the GROUP-LEVEL PRODUCER and ORDER BY operators can be combined into one operator, referred to as a "GROUP-LEVEL TOP-PRODUCER" operator. In this case, a more efficient implementation and data structure can be applied to avoid sorting all groups in advance.

Specifically, an input table R 1224 sources the input records to a GROUP-LEVEL TOP-PRODUCER operator 1226, the GROUP-LEVEL TOP-PRODUCER operator 1226 groups the input records into K partitions by a column expression <col-expr> and sorts the K partitions with each invocation of the loop or iterator, the K partitions are provided to an analytical function 1228, the function 1228 generates its entire output, and a TOP (K-|T|) operator 1230 is applied to the output records from the function 1228 to obtain only T output records as a result set for output 1232. Following the TOP (K-|T|) operator 1230, a signal is generated to the GROUP-LEVEL TOP-PRODUCER operator 1226 to provide the next K of the input records to the function 1228. When |T|=K, a "STOP" signal is sent to the GROUP-LEVEL TOP-PRODUCER operator 1226 to terminate execution.

3.5 Extensions to the Percentage Selection

All cases covered in Sections 3.3 and 3.4 have focused on the limit clause involving an absolute integer number K. This section briefly discusses the extensions to the percentage case ($\alpha$ %). The extension can be divided into two cases depending on the "input-to-output cardinality range" property of the function (refer to Section 3.2).

Case A: When the input-to-output cardinality range is [x, y], where x<y

This case means that the number of output records from the function is not precisely known even if the input size is known. In this case, no optimizations can be performed because the only way to know the $\alpha$ % size is to actually execute the function on the entire input, generate the output, and then calculate the desired size as $\alpha$ %.

Case B: When the input-to-output cardinality range is [x, y], where x=y

In this case and assuming the input size is known, the function's output size is also known, and this invention can calculate the $\alpha$ % of this output without executing the function. Here, the input size means either of: (1) if the granularity is row, then the input size refers to the number of records in R and the optimizing determines that $\alpha$ % of the input records are provided to the analytical function to obtain the output records specified by the limit query, or (2) if the granularity is partition, then the input size refers to the number of groups (partitions) in R and, after calculating the $\alpha$ % of the output size, the optimizing determines that $\alpha$ % of the output records are equivalent to the expression K. Thereafter, all proposed optimizations in Sections 3.3 and 3.4 apply.

SUMMARY

This invention proposes optimizing the class of analytical-limit queries, which involve limit clauses on analytical functions. The optimizations go beyond the state-of-art techniques that can only perform some optimizations over the limit clauses applied over standard SQL operators. The proposed optimizations minimize and eliminate irrelevant data as early as possible in the query plan, which brings numerous benefits in terms of I/O, CPU, concurrent execution, and resource utilizations. This is especially true and critical because most analytical function have time and/or space complexity that may go far beyond linear.

This invention proposes complementary static compile-time and dynamic run-time optimizations that cover a wide range of functions. The class of analytical-limit queries as well as the proposed optimizations are applicable to various database systems.

REFERENCES

The following publications and patents are incorporated by reference herein:
[1] PostgreSQL 8.1.23 Documentation, Chapter 7 Queries, 7.6 LIMIT and OFFSET, www.postgresql.org/docs/8.1/queries-limit.html, 1996-2020.
[2] ORACLE-BASE, Top-N Queries, www.oracle-base.com/articles/misc/top-n-queries, 2020.
[3] Quick Tip: Oracle Database 12c Makes Top-N, Inner-N, and Bottom-N Querying Easier, community.oracle.com/docs/DOC-995907, 2016.
[4] MySQL 8.0 Reference Manual, 13.2.10 SELECT Statement, dev.mysql.com/doc/refman/8.0/en/select.html, 2020.
[5] Teradata, SQL Data Manipulation Language, Chapter 1, TOP n, July 2015, docs.teradata.com/reader/2_MC9vCtAJR1K1e2RpbOmA/frQm7Rn09FJZZLQAuaUvJA.
[6] U.S. Utility application Ser. No. 16/704,802, filed Dec. 5, 2019, by B. Anantha Subramanian, Mohamed Yassin Eltabakh, Mahbub Hasan, Robert Matthew Wehrmeister, Awny Kayed Al-Omari, Sanjay Sukumaran Nair and Kashif Abdullah Siddiqui, entitled "Enabling Cross-Platform Query Optimization via Expressive Markup Language," now U.S. Patent Application Publication No. 2020/0183921.
[7] Teradata, SQL Functions, Operators, Expressions, and Predicates, Chapter 22, Ordered Analytical/Window Aggregate Functions, October 2015, docs.teradata.com/reader/kmuOwjp1zEYg98JsB8fu_/BPCFNfnkMty7-1mxikLaOiA.
[8] U.S. Utility application Ser. No. 16/724,565, filed Dec. 23, 2019, by Mohamed Eltabakh, Mohammed Al-Kateb, Awny AlOmari, Sanjay Nair, entitled "Autonomous Discovery of Functions' Properties for Optimizing Black Box Analytical Functions."

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:
1. A computer-implemented method, comprising:
executing a relational database management system (RDBMS) in a computer system, wherein the RDBMS manages a relational database comprised of one or more tables stored on one or more data storage devices connected to the computer system; and
optimizing a limit query over an analytical function in the RDBMS, wherein the analytical function is provided one or more input records stored in one or more of the tables of the relational database, the limit query specifies how many output records from the analytical function to return as a result set, and the optimizing determines how many of the input records are provided to the analytical function to obtain the output records specified by the limit query;
wherein the limit query includes an output clause comprising a LIMIT, TOP or SAMPLE clause or an expression specifying a limit that is a number K or a percentage α%; and
wherein the optimizing comprises maintaining a semantic property of granularity and a semantic property of input-to-output cardinality for the analytical function, wherein:
the semantic property of granularity defines an interdependency among the input records when processed by the analytical function, such that:
when the granularity is row, that indicates that the analytical function operates on each of the input records independent of others of the input records, such that, for a given one of the input records, adding or removing the others of the input records does not affect the output records obtained from the analytical function for the given one of the input records;
when the granularity is partition, that indicates that the input records are partitioned based on a user-defined criteria and that the analytical function operates on each partition independent of other partitions, such that, for a given partition, adding or removing the other partitions does not affect the output records obtained from the analytical function for the given partition; and
when the granularity is other, that indicates that the analytical function does not operate at the granularity of row or partition, such that the limit query cannot be optimized; and
the semantic property of input-to-output cardinality is a range of [x, y], where x is a minimum value and y is a maximum value, for how many output records are obtained per input record when the granularity is row, and how many output records are obtained per partition when the granularity is partition.
2. The method of claim 1, wherein the optimizing comprises minimizing the input records provided to the analytical function to obtain the output records specified by the limit query.
3. The method of claim 1, wherein the optimizing comprises a static compile-time optimization of the limit query.
4. The method of claim 3, wherein the static compile-time optimization comprises optimizing the LIMIT clause with the expression K,
when the granularity is row and the input-to-output cardinality is the range of [x, y] where x>1, and
a LIMIT CEILING operator of K/x is applied to the input records, only K/x of the input records are provided to the analytical function, and a LIMIT K operator is applied to the output records from the analytical function to obtain K of the output records as the result set.
5. The method of claim 3, wherein the static compile-time optimization comprises optimizing the LIMIT clause with the expression K,
when the granularity is partition and the input-to-output cardinality is the range of [x, y] where x>1, and
a grouping operator groups the input records into one or more partitions by a column expression, a LIMIT CEILING operator of K/x is applied to the partitions, only K/x of the partitions are provided to the analytical function, and a LIMIT K operator is applied to the output records from the analytical function to obtain K of the output records as the result set, or a GROUP-LIMIT operator groups the input records into one or more partitions by a column expression, only K/x of the partitions are provided to the analytical function, and a LIMIT operator is applied to the output records from the analytical function to obtain K of the output records as the result set.

6. The method of claim 3, the static compile-time optimization comprises optimizing the TOP clause with the expression K, when the TOP clause is paired with a preceding ORDER BY clause for selecting a top K of the input records with respect to an order expression, when the granularity is row and the input-to-output cardinality is the range of [x, y] where x>1, and an ORDER BY operator orders the input records by the order expression, a LIMIT CEILING operator provides only K/x of the input records to the analytical function, an ORDER BY operator orders the output records from the analytical function by the order expression, and a LIMIT operator is applied to obtain only K of the output records as the result set, or a LIMIT CEILING operator provides K/x of the input records to the analytical function, and a TOP K operator is applied to the output records from the analytical function to obtain only TOP K of the output records as the result set.

7. The method of claim 3, the static compile-time optimization comprises optimizing the TOP clause with an expression K, when the TOP clause is paired with a preceding ORDER BY clause with an order expression for selecting a TOP K of the input records with respect to the order expression, when the granularity is partition and the input-to-output cardinality is the range of [x, y] where x>1, and a grouping operator groups the input records into one or more partitions by a column expression, a TOP CEILING operator provides only K/x of the partitions to the analytical function, and a TOP K operator is applied to the output records from the analytical function to obtain only a TOP K of the output records as the result set, or a TOP-GROUPS operator groups the input records into one or more partitions according to a column expression, and only K/x of the partitions are provided to the analytical function, and a TOP K operator is applied to the output records from the analytical function to obtain only K of the output records as the result set.

8. The method of claim 3, the static compile-time optimization comprises optimizing the SAMPLE clause with an expression K, when the granularity is row and the input-to-output cardinality is the range of [x, y] where x=y=1, and a SAMPLE operator provides only K of the input records to the analytical function, and only K of the output records from the analytical function are obtained as the result set.

9. The method of claim 3, the static compile-time optimization comprises optimizing the SAMPLE clause with an expression K, when the granularity is partition and the input-to-output cardinality is the range of [x, y] where x=y=1, and a grouping operator groups the input records into one or more partitions by a column expression, a SAMPLE operator groups K of the partitions, the K of the partitions are provided to the analytical function, and the analytical function generates the output records as the result set, or a GROUP-SAMPLE operator groups the input records into K partitions by a column expression, the K partitions are provided to the analytical function, and the analytical function generates the output records as the result set.

10. The method of claim 1, the optimizing comprises a dynamic run-time optimization of the limit query, wherein a loop or iterator is used with the analytical function to control the input records provided to the analytical function, and to stop the loop or iterator once the output records are obtained as the result set.

11. The method of claim 10, the dynamic run-time optimization comprises optimizing the LIMIT clause with an expression K, when the granularity is row and the input-to-output cardinality is the range of [x, y] where x=0 and y>x, and a RECORD-LEVEL PRODUCER operator produces K of the input records with each invocation of the loop or iterator, the K of the input records are provided to the analytical function, and a LIMIT (K-|T|) operator is applied to the output records from the analytical function to obtain only T output records as the result set.

12. The method of claim 10, the dynamic run-time optimization comprises optimizing the LIMIT clause with an expression K, when the granularity is partition and the input-to-output cardinality is the range of [x, y] where x=0 and y>x, and a GROUP-LEVEL PRODUCER operator produces K partitions of the input records with each invocation of the loop or iterator, the K partitions are provided to the analytical function, and a LIMIT (K-|T|) operator is applied to the output records from the analytical function to obtain only T of the output records as the result set.

13. The method of claim 10, the dynamic run-time optimization comprises optimizing the TOP clause with an expression K, when the granularity is row and the input-to-output cardinality is the range of [x, y] where x=0 and y>x, and an ORDER BY operator sorts the input records based on an order expression, a RECORD-LEVEL PRODUCER operator iteratively provides a next K of the input records to the analytical function with each invocation of the loop or iterator, and a TOP (K-|T|) operator is applied to the output records from the analytical function to obtain only T of the output records as the result set, or a RECORD-LEVEL TOP-PRODUCER operator provides a next K of the input records to the analytical function with each invocation of the loop or iterator, and a TOP (K-|T|) operator is applied to the output records from the analytical function to obtain only T of the output records as the result set.

14. The method of claim 10, the dynamic run-time optimization comprises optimizing the TOP clause with an expression K, when the granularity is partition and the input-to-output cardinality is the range of [x, y] where x=0 and y>x, and a grouping operator groups the input records into one or more partitions by a column expression, an ORDER BY operator sorts the partitions based on an order expression, a GROUP-LEVEL PRODUCER operator iteratively provides a next K of the partitions to the analytical function with each invocation of the loop or iterator, and a TOP (K-|T|) operator is applied to the output records from the analytical function to obtain only T of the output records as the result set, or a GROUP-LEVEL TOP-PRODUCER operator groups the input records into K partitions by a column expression and sorts the K partitions with each invocation of the loop or iterator, the K partitions are provided to the analytical function, and a TOP (K-|T|) operator is applied to the output records from the analytical function to obtain only T of the output records as the result set.

15. The method of claim 1, wherein the optimizing comprises optimizing the LIMIT, TOP or SAMPLE clause with the expression α%, when the granularity is row and the input-to-output cardinality is the range of [x, y] where x=y, and the optimizing determines that α% of the input records are provided to the analytical function to obtain the output records specified by the limit query.

16. The method of claim 1, wherein the optimizing comprises optimizing the LIMIT, TOP or SAMPLE clause with the expression α%, when the granularity is partition and the input-to-output cardinality is the range of [x, y] where x=y, and the optimizing determines that a % of the output records are equivalent to the expression K.

17. A computer-implemented apparatus, comprising:

a computer system; and a relational database management system (RDBMS) executed by the computer system, wherein the RDBMS manages a relational database comprised of one or more tables stored on one or more data storage devices connected to the computer system; and the RDBMS optimizing a limit query over an analytical function, wherein the analytical function is provided one or more input records stored in one or more of the tables of the relational database, the limit query specifies how many output records from the analytical function to return as a result set, and the optimizing function determines how many of the input records are provided to the analytical function to obtain the output records specified by the limit query;

wherein the limit query includes an output clause comprising a LIMIT, TOP or SAMPLE clause or an expression specifying a limit that is a number K or a percentage α%; and wherein the optimizing comprises maintaining a semantic property of granularity and a semantic property of input-to-output cardinality for the analytical function, wherein:

the semantic property of granularity defines an interdependency among the input records when processed by the analytical function, such that:

when the granularity is row, that indicates that the analytical function operates on each of the input records independent of others of the input records, such that, for a given one of the input records, adding or removing the others of the input records does not affect the output records obtained from the analytical function for the given one of the input records;

when the granularity is partition, that indicates that the input records are partitioned based on a user-defined criteria and that the analytical function operates on each partition independent of other partitions, such that, for a given partition, adding or removing the other partitions does not affect the output records obtained from the analytical function for the given partition; and when the granularity is other, that indicates that the analytical function does not operate at the granularity of row or partition, such that the limit query cannot be optimized; and the semantic property of input-to-output cardinality is a range of [x, y], where x is a minimum value and y is a maximum value, for how many output records are obtained per input record when the granularity is row, and how many output records are obtained per partition when the granularity is partition.

18. A computer program product, the computer program product comprising a non-transitory computer readable storage medium having program instructions embodied therewith, the program instructions executable by a computer system to cause the computer system to perform a method, comprising:

executing a relational database management system (RDBMS) in a computer system, wherein the RDBMS manages a relational database comprised of one or more tables stored on one or more data storage devices connected to the computer system; and optimizing a limit query over an analytical function in the RDBMS, wherein the analytical function is provided one or more input records stored in one or more of the tables of the relational database, the limit query specifies how many output records from the analytical function to return as a result set, and the optimizing determines how many of the input records are provided to the analytical function to obtain the output records specified by the limit query;

wherein the limit query includes an output clause comprising a LIMIT, TOP or SAMPLE clause or an expression specifying a limit that is a number K or a percentage α%; and wherein the optimizing comprises maintaining a semantic property of granularity and a semantic property of input-to-output cardinality for the analytical function, wherein:

the semantic property of granularity defines an interdependency among the input records when processed by the analytical function, such that:

when the granularity is row, that indicates that the analytical function operates on each of the input records independent of others of the input records, such that, for a given one of the input records, adding or removing the others of the input records does not affect the output records obtained from the analytical function for the given one of the input records;

when the granularity is partition, that indicates that the input records are partitioned based on a user-defined criteria and that the analytical function operates on each partition independent of other partitions, such that, for a given partition, adding or removing the other partitions does not affect the output records obtained from the analytical function for the given partition; and when the granularity is other, that indicates that the analytical function does not operate at the granularity of row or partition, such that the limit query cannot be optimized; and the semantic property of input-to-output cardinality is a range of [x, y], where x is a minimum value and y is a maximum value, for how many output records are obtained per input record when the granularity is row, and how many output records are obtained per partition when the granularity is partition.

* * * * *